US008689517B2

(12) United States Patent
Schaefer et al.

(10) Patent No.: US 8,689,517 B2
(45) Date of Patent: Apr. 8, 2014

(54) ROOF MOUNT SEALING ASSEMBLY

(71) Applicant: D Three Enterprises, LLC, Lafayette, CO (US)

(72) Inventors: Richard F. Schaefer, Fort Lupton, CO (US); David Kreutzman, Louisville, CO (US); Don N. Tamm, Denver, CO (US)

(73) Assignee: D Three Enterprises, LLC, Lafayette, CO (US)

( * ) Notice: Subject to any disclaimer, the term of this patent is extended or adjusted under 35 U.S.C. 154(b) by 0 days.

(21) Appl. No.: 14/018,137

(22) Filed: Sep. 4, 2013

(65) Prior Publication Data

US 2014/0007532 A1  Jan. 9, 2014

Related U.S. Application Data

(60) Division of application No. 13/799,359, filed on Mar. 13, 2013, which is a continuation of application No. 13/368,332, filed on Feb. 8, 2012, now Pat. No. 8,448,405, which is a continuation-in-part of application No. 12/700,667, filed on Feb. 4, 2010.

(60) Provisional application No. 61/255,082, filed on Oct. 26, 2009, provisional application No. 61/150,301, filed on Feb. 5, 2009, provisional application No. 61/440,847, filed on Feb. 8, 2011.

(51) Int. Cl.
*E04B 1/38* (2006.01)
*F16B 9/02* (2006.01)
*E04D 1/34* (2006.01)
*E04H 12/22* (2006.01)

(52) U.S. Cl.
CPC . *F16B 9/026* (2013.01); *E04D 1/34* (2013.01); *E04H 12/2276* (2013.01)
USPC .................................................. 52/710; 52/60

(58) Field of Classification Search
CPC ....... E04D 13/10; E04D 1/34; E04H 12/2276; E04G 21/142; E04G 5/16; E04G 5/162; E04G 5/18; E04B 1/4128; F16B 9/02
USPC ............ 248/237, 500, 505, 656, 669; 52/239, 52/282.1, 282.3, 647, 653.1, 653.2, 654, 52/655.1, 543, 548, 549
See application file for complete search history.

(56) References Cited

U.S. PATENT DOCUMENTS 2,095,832 A   10/1937   Retzke
3,104,120 A    9/1963   Myers
4,640,535 A    2/1987   Hermann (Continued)

FOREIGN PATENT DOCUMENTS

JP   2006144268   6/2006
WO  2007079584   7/2007

*Primary Examiner* — William Gilbert
(74) *Attorney, Agent, or Firm* — Russell T. Manning; Marsh Fischmann & Breyfogle LLP

(57) ABSTRACT

A variety of roof mount sealing assemblies are disclosed. The roof mount sealing assemblies allow a user to mount rails for solar panels, signs, satellite dish or any other desired item on the roof and have the mounting location sealed against water. The roof mount sealing assemblies has a body with a recess for a flexible washer, which is attached to a bolt body (or formed with the bolt body) and threaded either down in a base plate or directly into the roof. The bolt body and body form a double stud assembly, which also holds a flashing onto the roof to provide further water proofing.

20 Claims, 25 Drawing Sheets

(56) References Cited

U.S. PATENT DOCUMENTS

| | | |
|---|---|---|
| 4,739,596 A | 4/1988 | Cunningham et al. |
| 5,482,329 A | 1/1996 | McCall et al. |
| 5,594,202 A | 1/1997 | Tobias |
| 5,729,938 A | 3/1998 | Tobias |
| 5,746,839 A | 5/1998 | Dinwoodie |
| 6,360,491 B1 | 3/2002 | Ullman |
| 6,378,167 B1 | 4/2002 | Howell, III et al. |
| 6,516,741 B1 | 2/2003 | Sorum et al. |
| 6,526,701 B2 | 3/2003 | Stearns et al. |
| 6,698,799 B2 | 3/2004 | Anderson et al. |
| 6,969,799 B2 | 11/2005 | Snyder |
| 7,128,345 B2 | 10/2006 | Bartholoma et al. |
| 7,762,027 B1 | 7/2010 | Wentworth et al. |
| 7,762,030 B2 | 7/2010 | Espinosa |
| 7,861,485 B1 | 1/2011 | Wentworth et al. |
| 7,895,808 B1 | 3/2011 | Wentworth et al. |
| 7,905,064 B1 | 3/2011 | Wentworth et al. |
| 8,158,884 B2 | 4/2012 | de la Borbolla |
| 8,166,713 B2 | 5/2012 | Stearns et al. |
| 8,176,693 B2 | 5/2012 | Abbott et al. |
| 8,181,398 B2 | 5/2012 | Stearns et al. |
| 8,225,557 B2 | 7/2012 | Stearns et al. |
| 8,245,454 B2 | 8/2012 | Stearns et al. |
| 8,272,174 B2 | 9/2012 | Stearns et al. |
| 2007/0137126 A1 | 6/2007 | Sommerhein |
| 2010/0192505 A1 | 8/2010 | Schaefer et al. |
| 2010/0307074 A1 | 12/2010 | Stearns et al. |
| 2011/0120047 A1 | 5/2011 | Stearns et al. |
| 2011/0179727 A1 | 7/2011 | Liu |
| 2011/0247279 A1 | 10/2011 | Stearns et al. |
| 2011/0247295 A1 | 10/2011 | Stearns et al. |
| 2012/0023843 A1 | 2/2012 | Stearns et al. |
| 2012/0031019 A1 | 2/2012 | Stearns et al. |
| 2012/0031024 A1 | 2/2012 | Selke et al. |

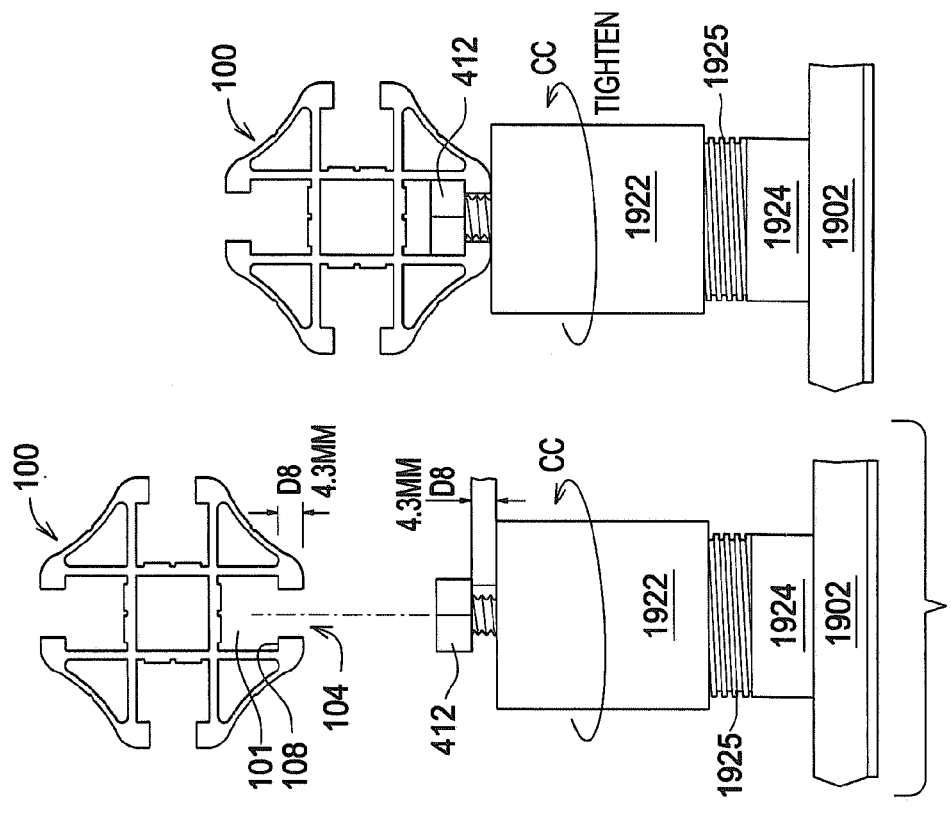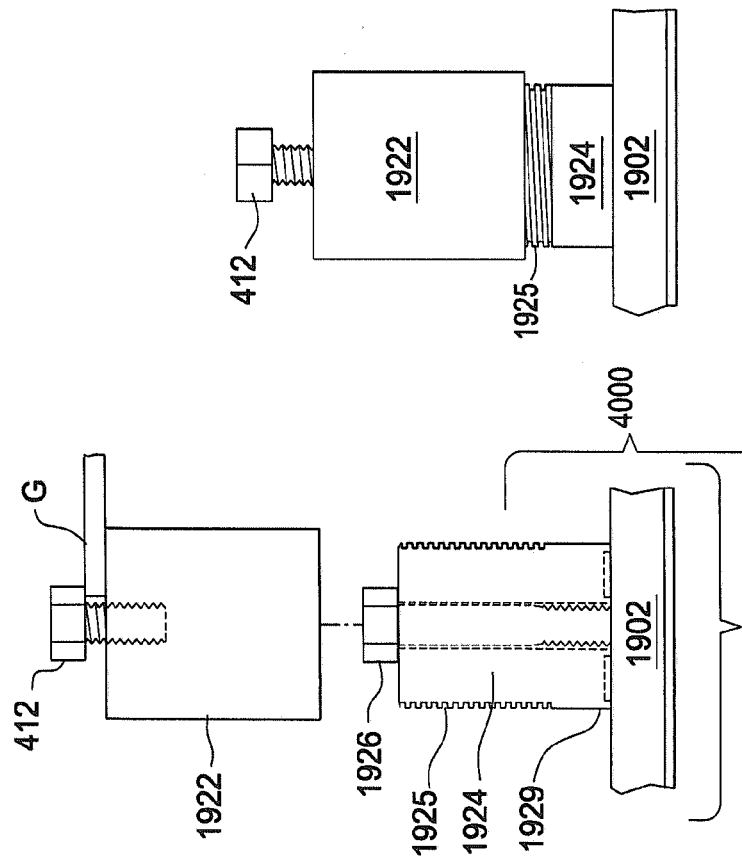

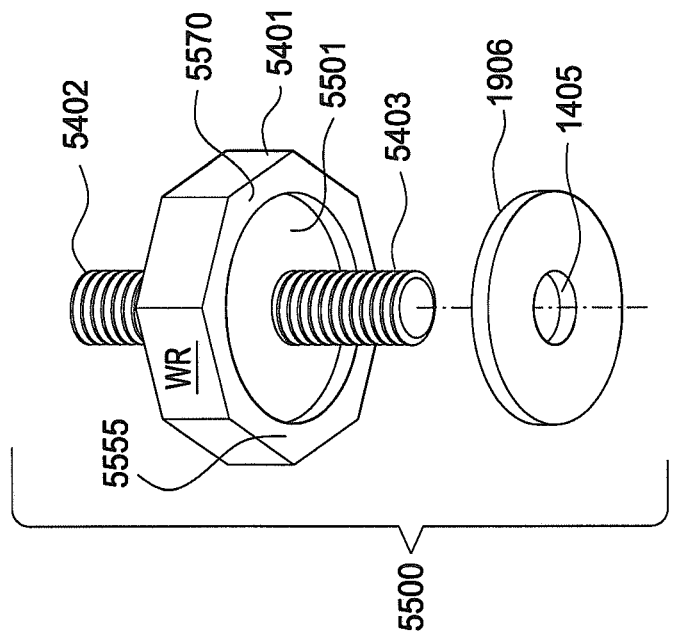
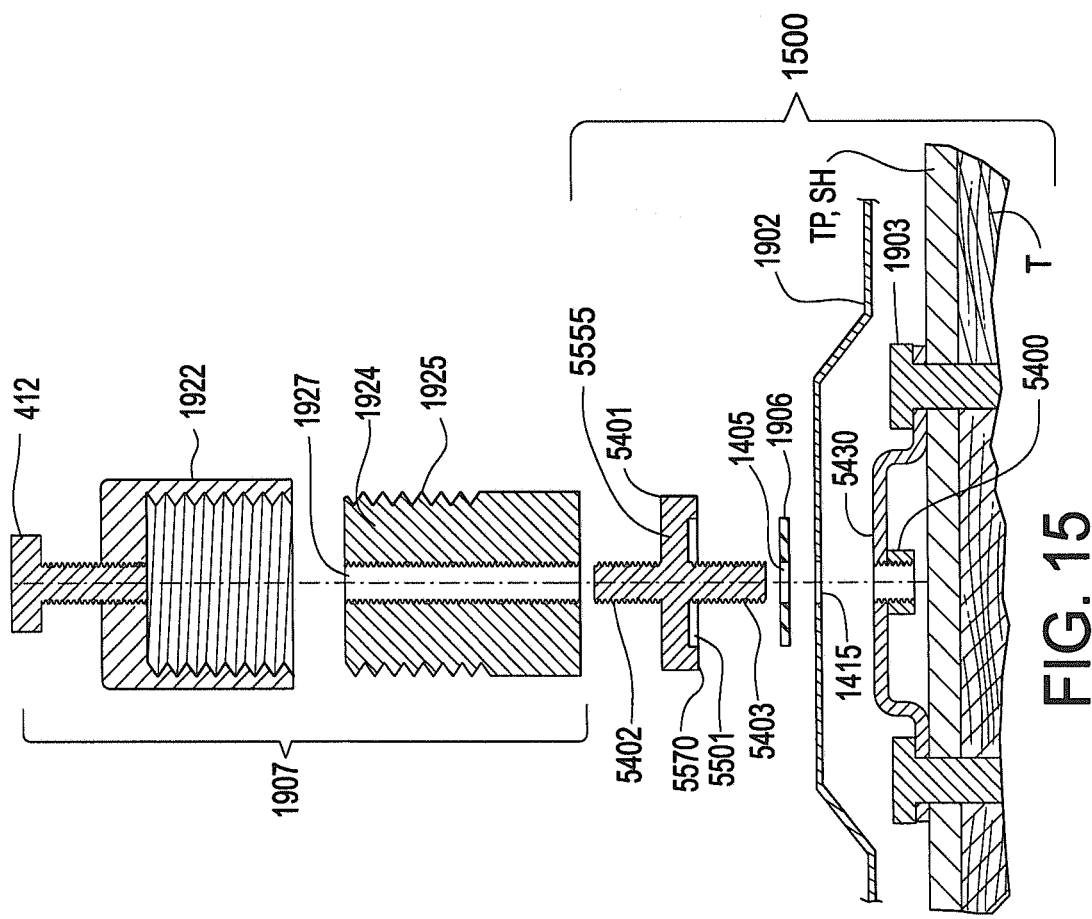

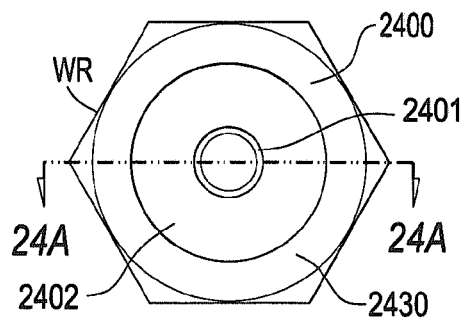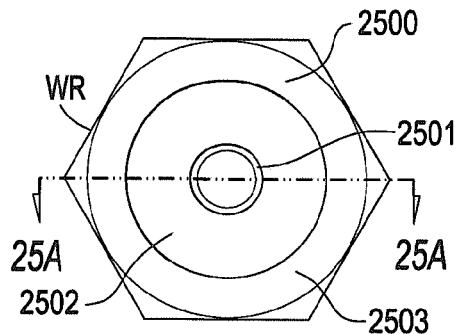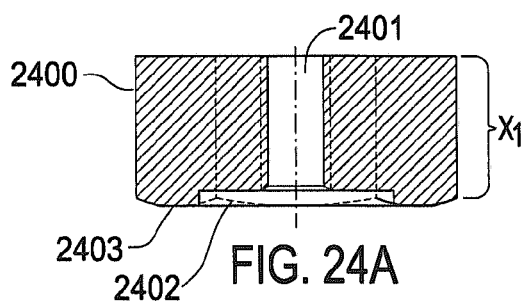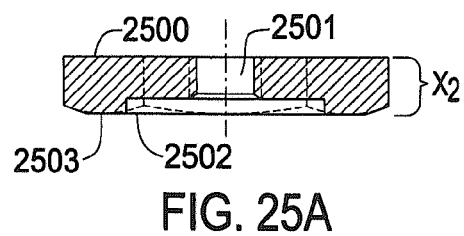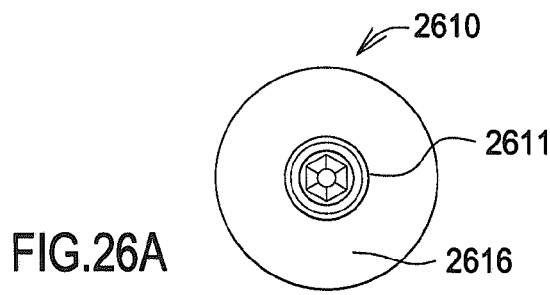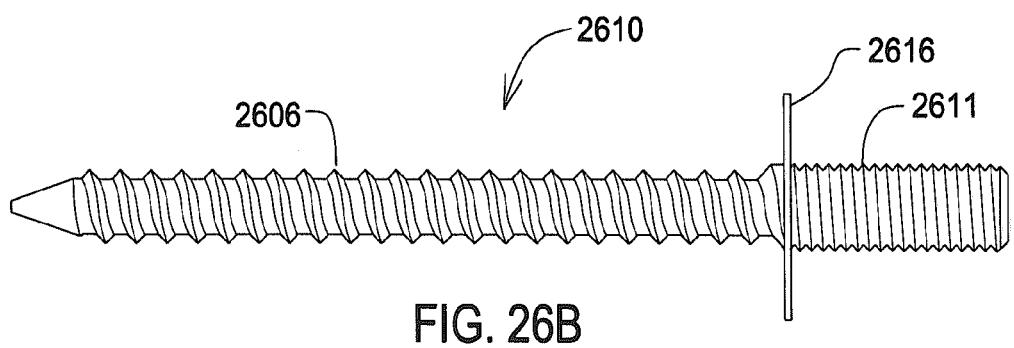

US 8,689,517 B2

ROOF MOUNT SEALING ASSEMBLY

CROSS REFERENCE APPLICATIONS

This application is a continuation of Ser. No. 13/799,359 filed Mar. 13, 2012, which is a continuation of application Ser. No. 13/368,332, filed Feb. 8, 2012, now U.S. Pat. No. 8,448, 405, which claims the benefit of provisional application 61/440,847, filed Feb. 8, 2011; the Ser. No. 13/368,332 application, now U.S. Pat. No. 8,448,405, is also a continuation in part of non-provisional application 12/700,667 filed Feb. 4, 2010, pending, which claims the benefits of provisional application no. 61/255,082 filed Oct. 26, 2009 and provisional application no. 61/150,301 filed Feb. 5, 2009. All of these applications are hereby incorporated by reference for all purposes.

BACKGROUND

Roof pipe and electrical flashings exist to seal penetrations on roofs. Prior art pipe and electrical flashings provide elastic seals which utilize a combination of metal and rubber pieces. These rubber pieces are exposed to the elements and eventually degrade, allowing elements such as moisture in the home.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

One aspect of the roof mounting assembly described herein is a waterproof assembly mounting devices such as solar panels and signs on roofs. Another aspect of the device described herein is to provide a flashing assembly which requires no caulking or exposed rubber. If desired, caulking or other weather stripping can be added without changing the nature of the assembly.

One application uses the watertight standoff system to support interlocking racks which hold solar panels and/or other panels off the surface of a roof.

In the disclosed embodiments, a body is used to encapsulate a flexible washer to protect the washer from ultra violet light and other environmental factors that degrade the flexible washer. This also allow the flexible washer to be put under pressure to create a more water resistant seal.

Another aspect is the fact that the washer is or can be compressed between elements of the roof mounting system and not between elements of the roof or other surface. Therefore, as the roof components age (wood dries out, shingles age) the water proof nature of the disclosed roof mounting systems does not change. Known prior systems rely on the roof structure to maintain pressure of the waterproof seal, which may be degraded as the roof elements age, i.e. a rafter may dry out and split.

Another advantage of the disclosed roof mounting system is that dissimilar material s can be used without causing dielectric effects. The washer (or washers) can be used to separate elements made of dissimilar metals. Given the materials above the roof are in environmental conditions that are uncontrollable and can cause severe damage to many products, the washer separates and prolongs the life of the metal embodiments of the roof mounting assembly components due to the nature that they are dielectrically separated by the silicone rubber (or other material) washer.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 4 is an exploded view of the standoff of FIG. 3.

FIG. 5 shows the FIG. 3 standoff initially installed.

FIG. 6 shows the FIG. 3 standoff ready to accept a support post.

FIG. 7 shows the FIG. 3 standoff attached to a support post.

FIG. 15 is a cross sectional exploded view of a standoff with a double bolt stud.

FIG. 16 is a bottom perspective view of the double bolt stud.

FIGS. 24 a and b are views of one embodiment of the body of the double stud bolt.

FIGS. 25 a and b are views of a second embodiment of the body of the double stud bolt.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 2:
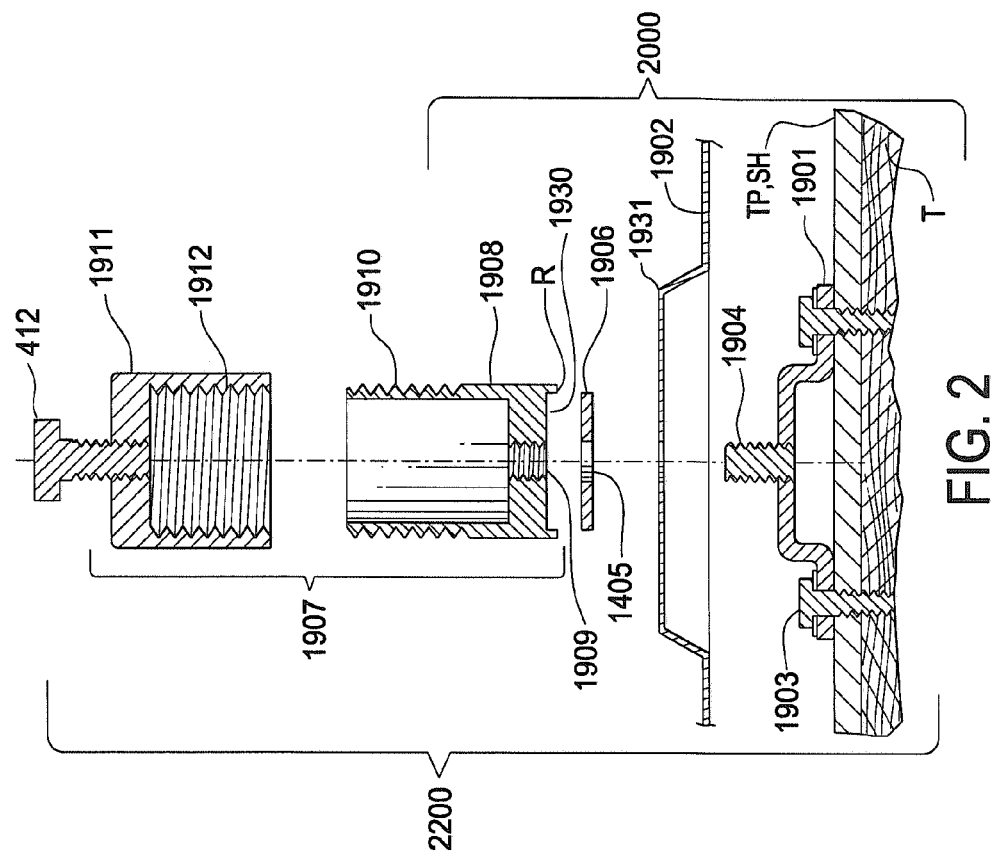
FIG. 2 is a cross section of the standoff and flashing of FIG. 1.
Figure 1:
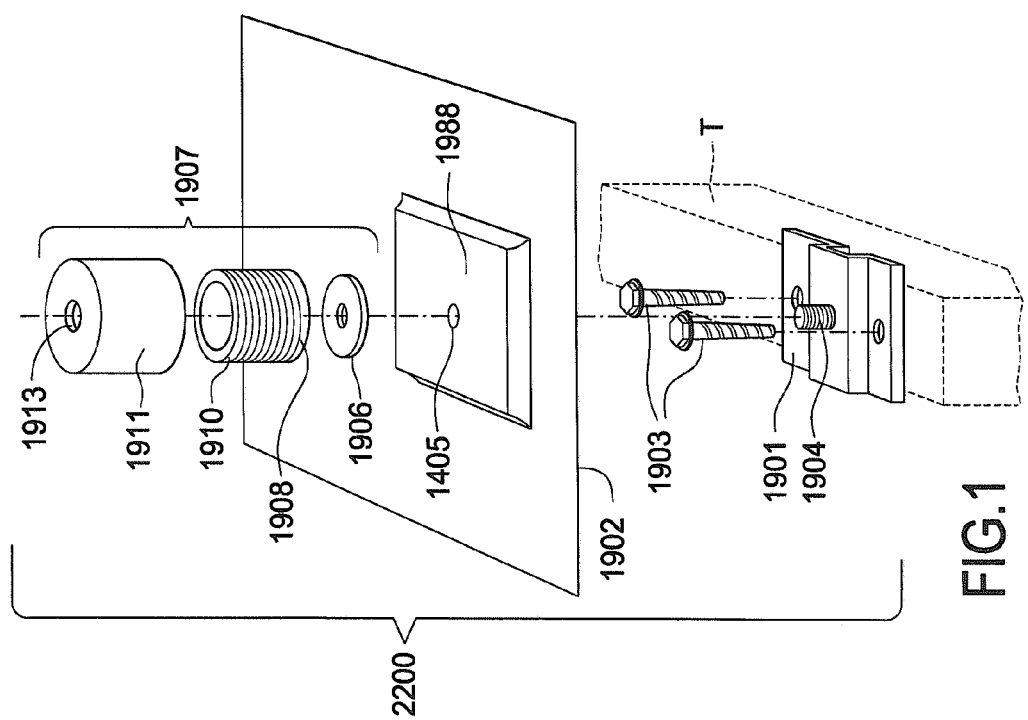
FIG. 1 is an exploded view of a standoff and flashing to attach a support member to a roof or other surface.

FIGS. 1, 2 show a flashing and standoff 2200 that can be used when mounting a frame or rack on a roof or similar surface. Base 1901 attaches to the roof truss T or other surface with screws 1903, two screws in the depicted embodiment. Known flashing 1902 (preferably sheet metal) is placed over the base 1901 to prevent water from getting to the holes created by the screws. Flashing 1902 has raised area 1988 to allow the flashing 1902 to enclosed base 1901. With prior art standoffs, there are problems with water getting into the standoff and causing corrosion of the standoff. The present standoff 2200 solves this issue with a roof mount sealing assembly.

Threaded bolt 1904 extends up from base 1901, through hole 1415 in flashing 1902. Core 1908 has a threaded hole 1909 which threads onto bolt 1904. A soft flexible washer 1906 having hole 1405 is placed between the core 1908 and flashing 1903 in circular recess 1930 to provide a water-tight or near water-tight seal with ridge R creating a metal to metal joint against flashing 1902 in the depicted embodiment. As core 1908 is solid other than threaded hole 1909 and recess 1930, once core 1908 is screwed down on to bolt 1904 with the flexible washer 1906, a watertight, or nearly water tight, seal is formed over the hole 1415 in flashing 1902, forming a roof mount sealing assembly 2000. This helps to prevent water from getting under the flashing 1902. The soft flexible washer 1906 is compressed between the top surface 1931 of the flashing 1902 and the recess 1930. In the depicted embodiment the washer is a soft flexible material. Rubber/synthetic rubber/silicone or other suitable compressible washer material using any known or later discovered polymer with similar properties could be used as well.

Core 1908 has an outer surface with threads 1910. Cover 1911 has a threaded recess 1912, seen in FIG. 2, which corresponds to threads 1910, allowing the cover 1911 to be threaded down on to core 1910. The cover 1911 has a top threaded recess 1913, which does not connect to threaded recess 1912. The height of the stand-off is adjusted by choosing how far down cover 1991 is threaded on to core 1908. This allows for very precise and replicable height adjustments. Bolt 412 can be threaded into hole 1913 to allow desired objects to be attached to the top of cover 1911 as will be discussed in greater detail below.

FIGS. 3 to 7 show the roof truss T with a roof surface TP on top of truss T with another type of standoff. A shingle SH is exposed to the environment. Base 1999 serves as an anchor for the entire standoff assembly 2222 and is attached to the roof truss T with screws 103 as above. Base 1999 differs from base 1901 in that it has a threaded hole 1920, instead of bolt 1904. Water is prevented from reaching screws 1903 by flashing 1902 as above. The flashing 1902 is made waterproof at its periphery E in known manners including glue, tar, overlay shingles. Hole 1920 has threads to accept bolt 1926 which secures the core 1924 to the base 1999, forming roof mount sealing assembly 4000 as shown in FIG. 4. The soft flexible washer 1906 fits into donut recess 1928 at the bottom of the core 1924. Rim 1928 is circular and seals the flexible washer 1906 inside the metal to metal joint of members 1929 against 1902 in the depicted embodiment. Thus flexible washer 1906 is protected from the elements, particularly ultraviolet light, and little or no water can get into hole 1405.

The threads 1925 receive the cover 1922. After the cover 1922 is set to the desired height the mounting bolt 1921 is set to a desired height as shown by gauge G in FIG. 4 forming height D8 in FIG. 6. Bolt 412 threads into hole 1923.

Figure 8:
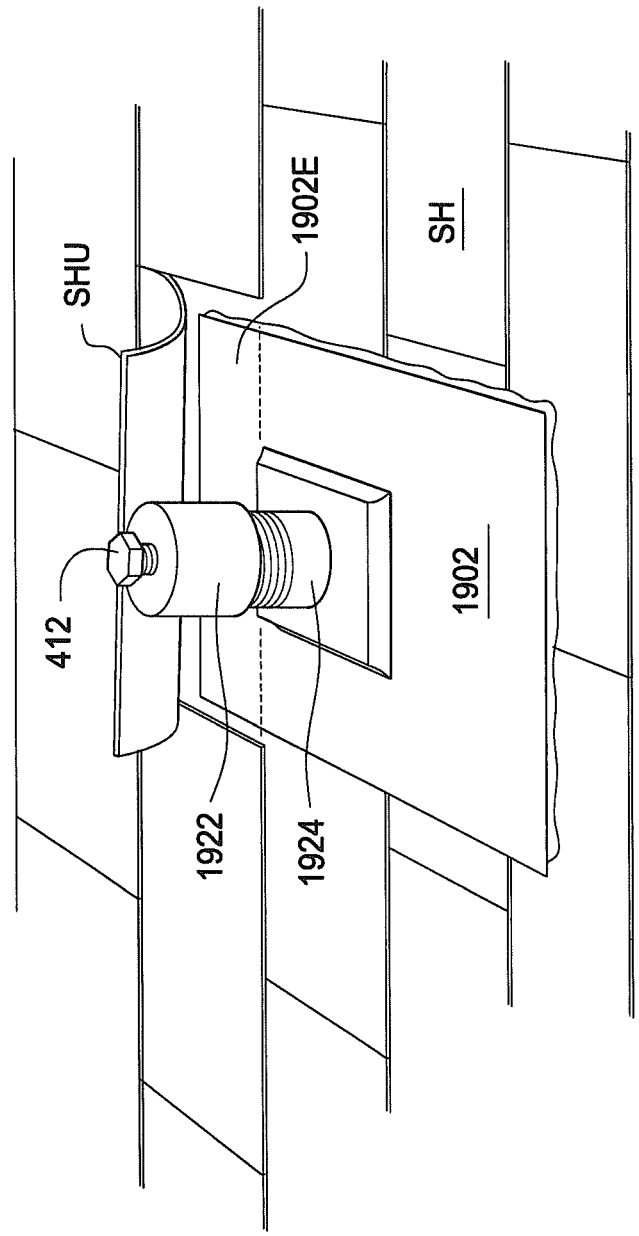
FIG. 8 is a top perspective view of a standoff being installed.
Figure 9:
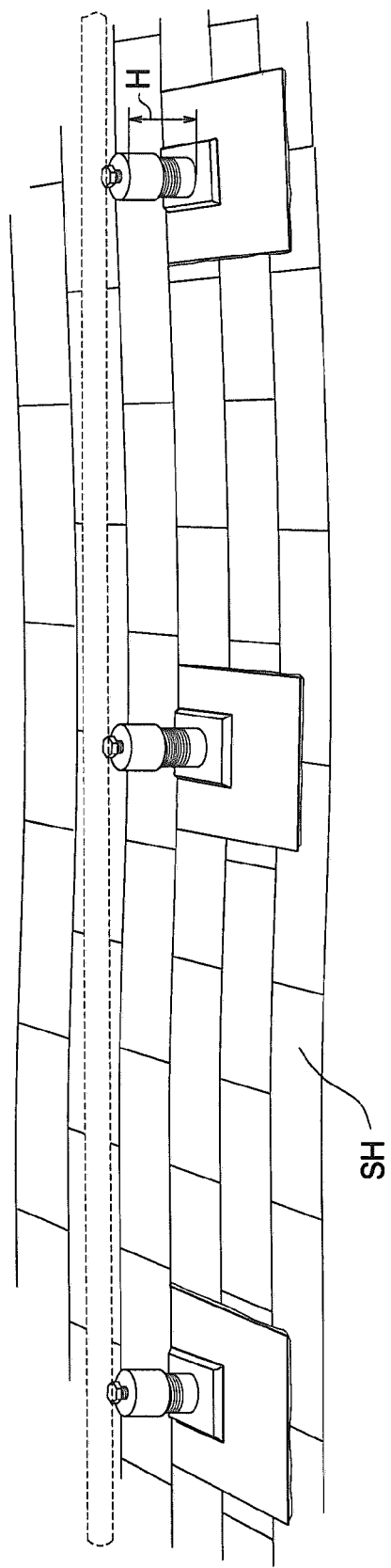
FIG. 9 is a top perspective view of a row of standoffs on a roof.

A series of assemblies 2222 can be mounted on a roof in a straight line ready to support a support post 100 as shown in FIGS. 8 and 9. The jaw 104 is slid down a series of aligned bolts 412. Then each cover 1922 is tightened (turned counterclockwise CC) thereby locking bolt 412 against lip 108, shown in FIGS. 6 and 7. No tools are needed.

Figure 3:
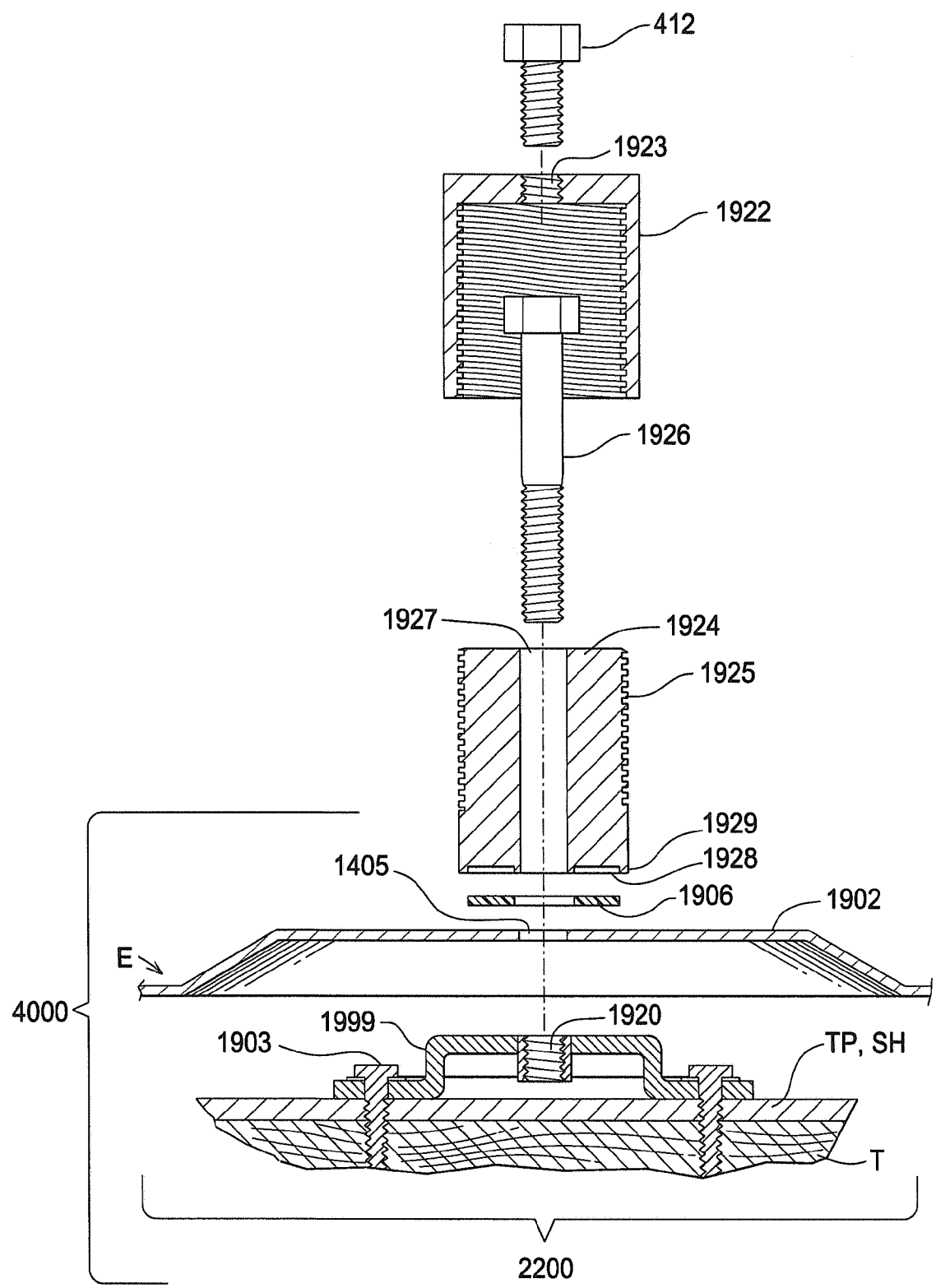
FIG. 3 is a cross section of another standoff and flashing.

FIG. 8 shows a method to affix the FIG. 3 embodiment 2222 on a shingle roof. Shingle SHU is lifted to cover the edge 1902e of flashing 1902.

FIG. 9 shows the support post 100 mounted at a uniform height UH above a curving roof SH. Each bolt 412/cover 1922 combination is raised up or down shown by arrows U, D to level post 100.

Figure 11:
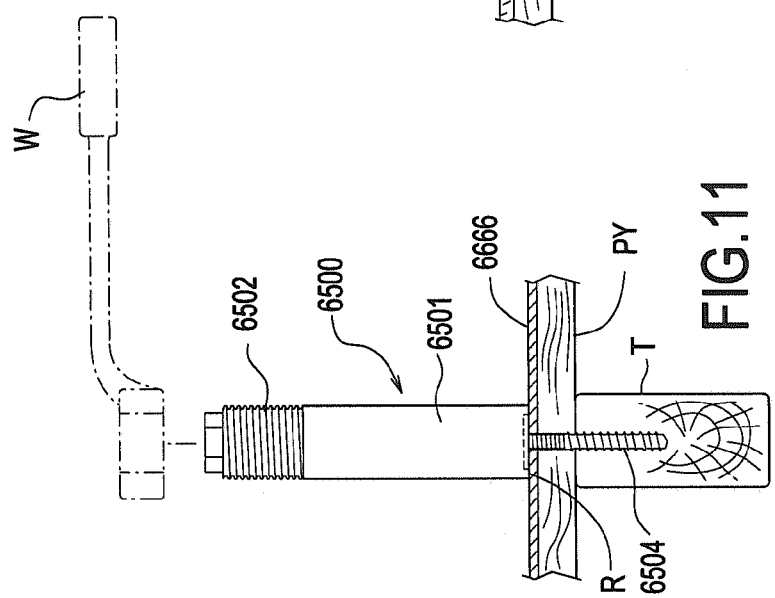
FIG. 11 is a partial sectional view of the roof anchor installed through a metal roof.
Figure 10:
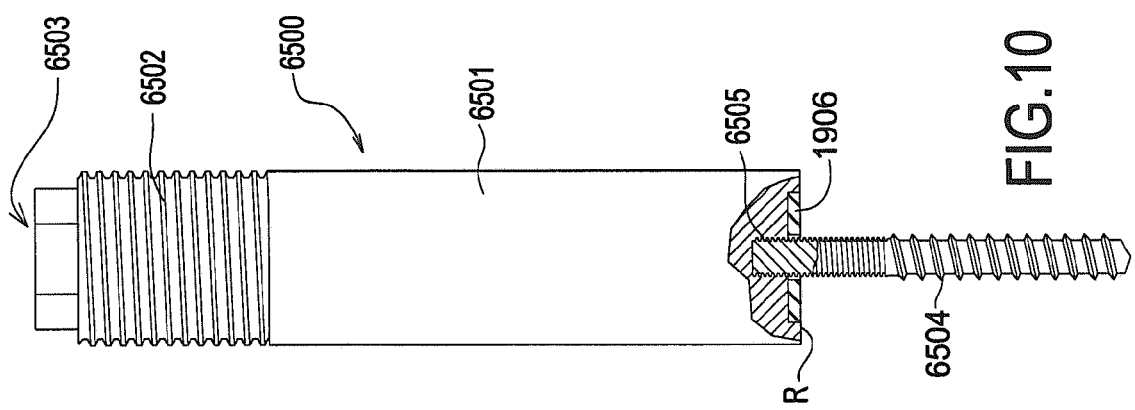
FIG. 10 is a side elevation view of a roof anchor.

Referring next to FIGS. 10-14 a roof anchor 6500 has a cylindrical body 6501 with a threaded upper section 6502 in the depicted embodiment. The external threads 6052 are optional, and an not required in all embodiments. A threaded hole 6503 can receive a bolt so as to act like bolt 412 in FIG. 2. Alternately an Allen head or screw head or the like could be on the top to allow the roof anchor 6500 to be attached. Solar racks can be built atop the bolt (not shown) that would be threaded into hole 6503. The screw 6504 is threaded into mounting hole 6505 at the bottom of body 6501. A recess 6999 receives flexible washer 1906 similar to FIG. 2, wherein ridge R protects the washer from the sun and can provide a metal to metal seal and forming the roof mount sealing assembly. FIG. 11 shows a metal roof 6666 using ridge R for a metal to metal seal. A cover 1911 (FIG. 2) could also be put on threads 6502, thus providing height adjustment for a bolt 412. Wrench face WR allows a socket SOC or wrench W to screw the screw 6504 into a truss T.

Figure 12:
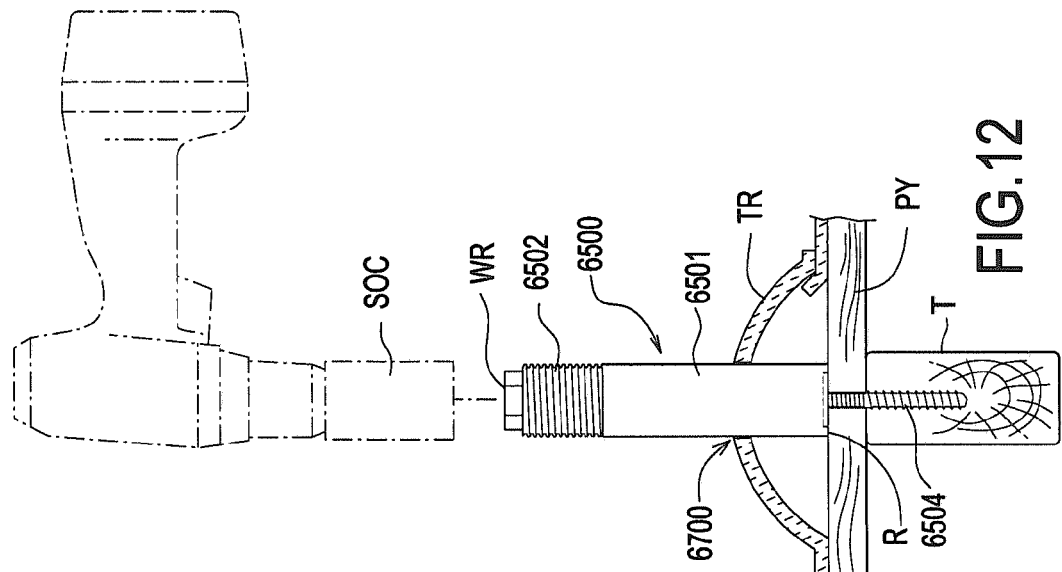
FIG. 12 a partial sectional view of the roof anchor installed through a roof tile.

FIG. 12 shows a tile roof TR having the tile TR drilled with a hole 6700 to allow anchor 6500 to be placed down atop a truss T. Usually a plywood roof layer PY is present. So even on a tile roof the anchor 6500 provides the support for a solar panel rack and forms the roof mount sealing assembly.

Figure 14:
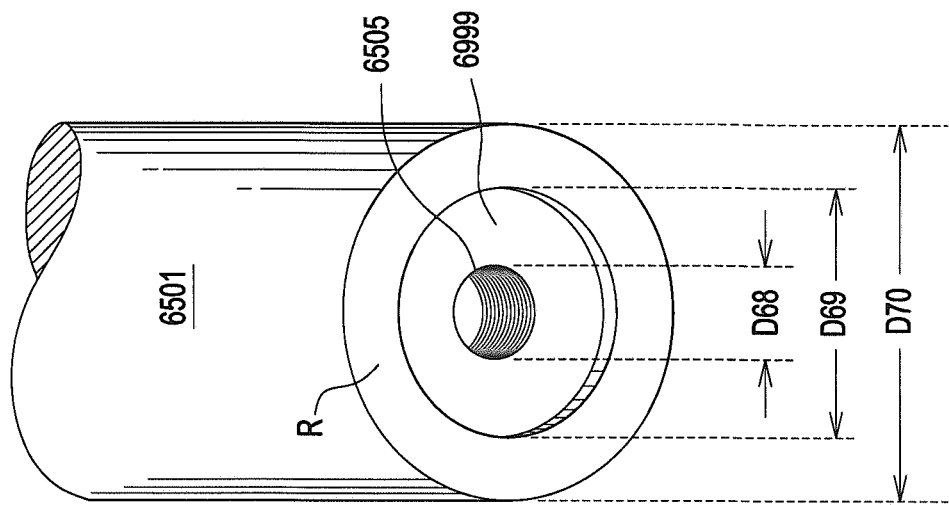
FIG. 14 is a bottom perspective view of a threaded hole embodiment of the roof anchor of FIG. 10.
Figure 13:
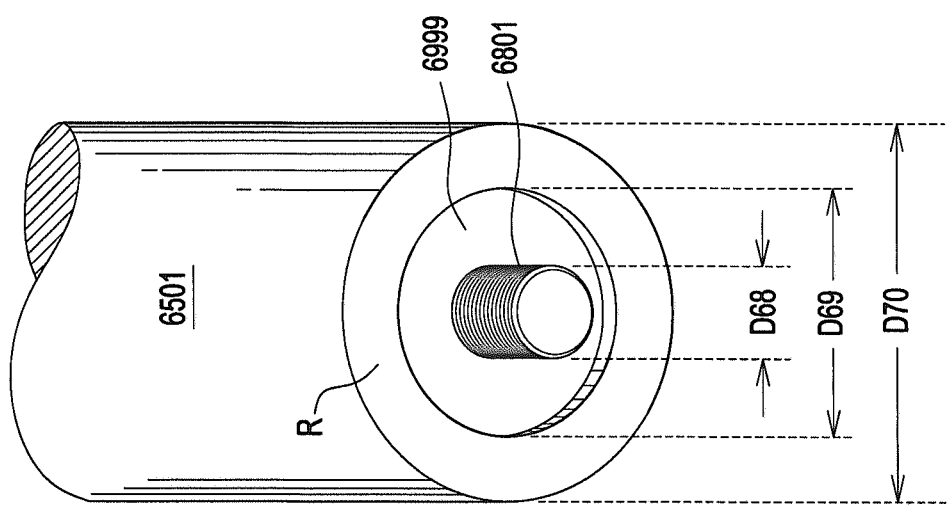
FIG. 13 is bottom perspective view of a bolt embodiment of the roof anchor of FIG. 10.

In FIGS. 13, 14 nominal dimensions are D68=0.38 inch, D69=1.0 inch, D70=1.5 inch. The threaded hole 6505 serves as a mount for attaching to various stand offs including the embodiments of FIG. 2 and FIG. 10. The hole 6505 would receive bolt 1904 (FIG. 2). The FIG. 13 embodiment with bolt 6801 can be used to insert into boss 5400 of FIG. 3. All the embodiments protect the flexible washer 1906 from the sun via a recess such as 6999.

In all embodiments the user has the option to tighten the threads until the ridge is in contact with the flashing, creating a metal to metal seal. Alternatively, the body is tightened down until the flexible washer is compressed to seal the hole, but the metal to metal contact is avoided. In either situation, the combination of the flashing and the recess substantially enclosed the washer, and encapsulate it, preventing ultraviolet light and other environmental factors from degrading the washer. The flexible washer thickness and the metal recess depth allow the flexible washer to compress and completely fill the recess void when desired. The physical properties of the flexible washer will hold also a space between the flexible washer body and the flashing, but this can be adjusted for the desired result.

In all embodiments, the flashing can be made of aluminum, copper, stainless steel, metal, coated metal plastic, fiberglass, composites, plastic, ceramic, rubber, polymer, concrete, cementitious or any other material that is sufficiently rigid and durable to provide the flat surface for compression of the flexible washer and, if desired the contact between the ridge and the flashing. The roof mount sealing assembly and the stand-off components can be made of aluminum, mild steel, stainless steel, copper, nickel or any other material with the necessary physical characteristic. In some applications the roof mount sealing assembly and/or standoff will need to be conducting, in order to allow for grounding of the components mounted on the system. In all embodiments, if desired the installer can put caulk or other sealant around all joins as a further assurance of water proof joins. This is not necessary under normal usage conditions, but may be desired in harsh environments and/or remote locations.

Referring next to FIGS. 15, 16 a standoff 1907 is attached to a base 5430 screwed into a roof truss T via screws 1903. The base 5430 has a threaded boss 5400. A flashing 1902 with hole 1415 is placed atop the boss 5400. A soft flexible washer 1906 has hole 1405 aligned with hole 1415. The double bolt stud 5401 has a body 5555, a lower bolt 5403 and an upper bolt 5402. The lower bolt 5403 extends through hole 1425 and screws into boss 5400 in base 5430. The flexible washer 1906 is received in recess 5501 in body 5555. The ridge 5570 protects the flexible washer 1906 from the sun and forms a watertight or nearly watertight seal, against flashing 1902, forming another embodiment of the roof mount sealing assembly 1500. If desired, the body 5555 can be tightened down until a metal to metal contact between the ridge 5570 and the flashing 1902 is achieved. The body 5555 has wrench surfaces WR to allow a wrench to tighten the stud 5401 as desired in the depicted embodiment. The wrench surfaces WR could be configured in a wide variety of shapes and configurations to use with different tightening devices. In alternate embodiments the double bolt stud can be tightened with screw drivers (strait and Phillips) Allen wrenches and other such tightening devices by forming appropriate recesses in upper bolt 5402 (not shown). Additionally, other types of wrench surfaces could be formed on the upper surface of double bolt stud 1501. In this embodiment, the upper bolt 5402 receives the core 1924 of a standoff 1907 via threaded hole 1927. The core outer threads 1925 receive the cover 1922. A mounting bolt 412 is screwed into the top of the cover 1922 to provide an anchor for support posts and any desired attachment. The double bolt stud/washer assembly is denoted 5500.

Figure 17:
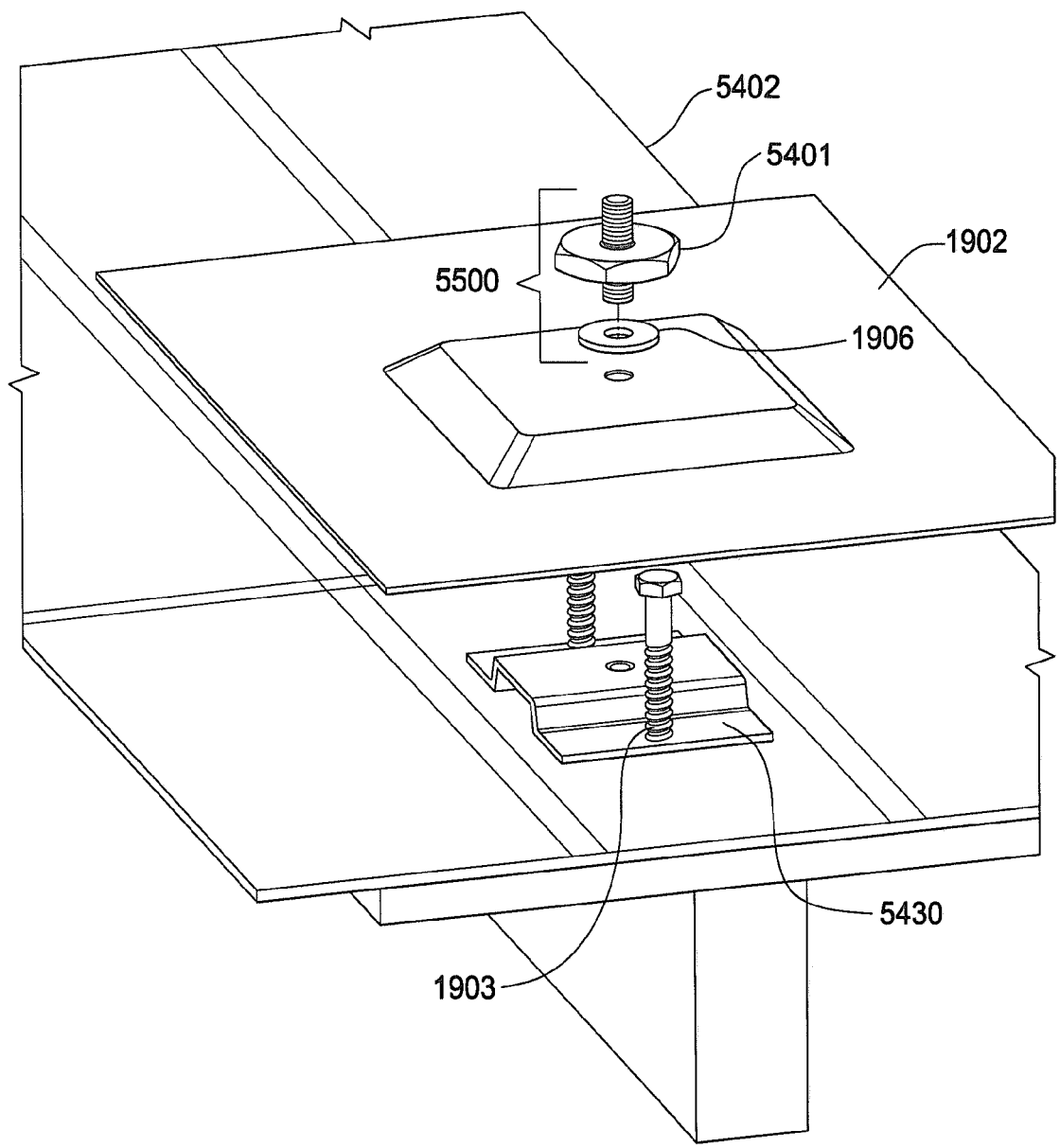
FIG. 17 is an exploded view of the double bolt stud assembly being installed.

Referring next to FIG. 17, the double stud/washer assembly 5500 is shown exploded with the flashing 1902, base 5430 and screws 1903, which combined form one embodiment of the roof mount sealing assembly 1500. The upper bolt 5402 can be attached to a wide variety of items that one could wish to mount on a roof. The recess 5501 and flexible washer 1906 combine to make a water tight, or near water tight seal that can be used for a wide variety of applications.

Figure 18:
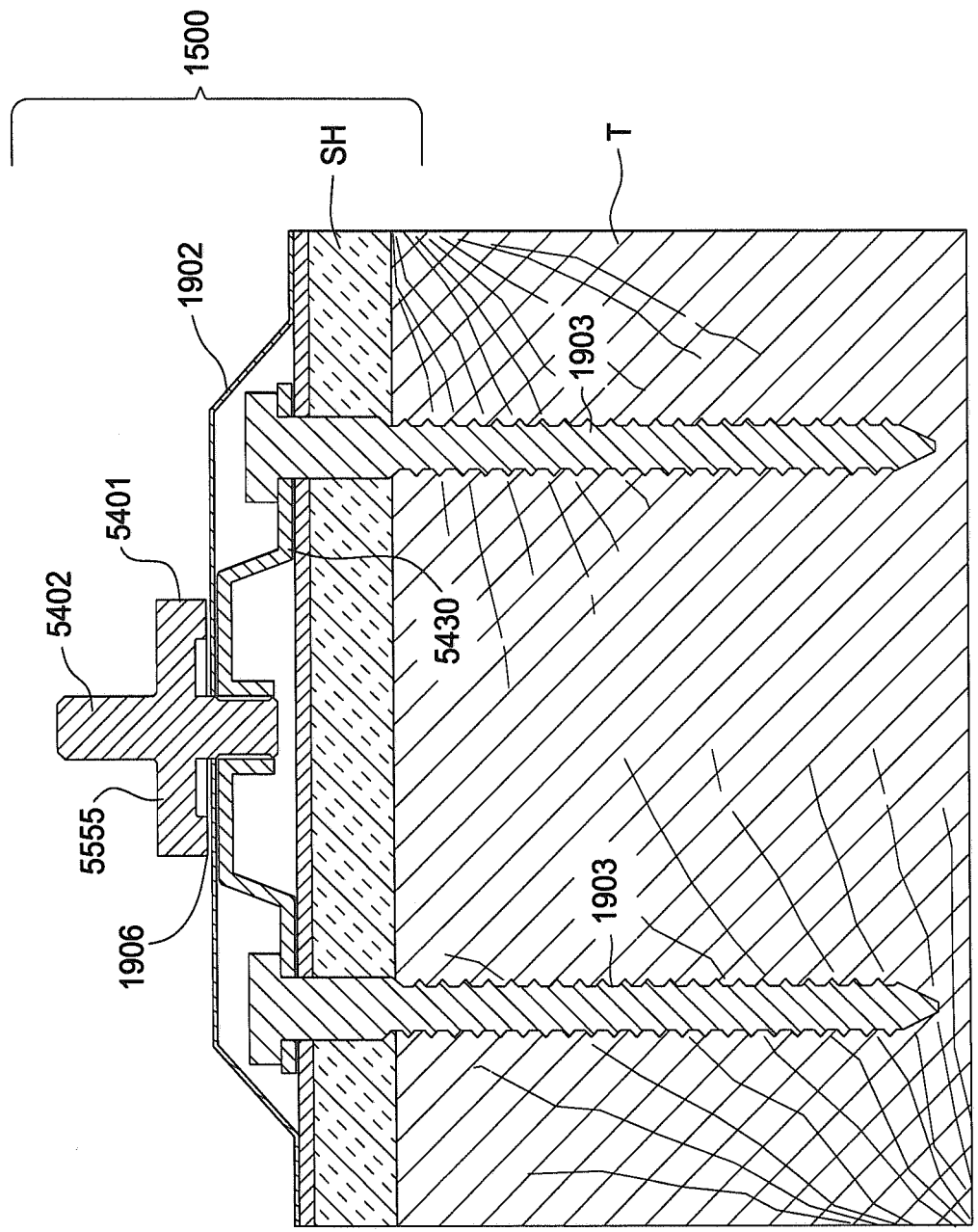
FIG. 18 is a cross sectional view of an installed double bolt stud assembly.

FIG. 18 is a cross section of the double stud assembly 5500 mounted on a truss T. The flexible washer 1906 is enclosed in the body 5555 and ridge 5570 and protected from elements. Also, the configuration of the flashing 1902 and the body 5555 allow the washer to be compressed between two substantially flat surfaces while being prevented from deforming outward by ridge 5570. This protects the flexible washer 1906 and allows for better seals than other arrangements.

Figure 19:
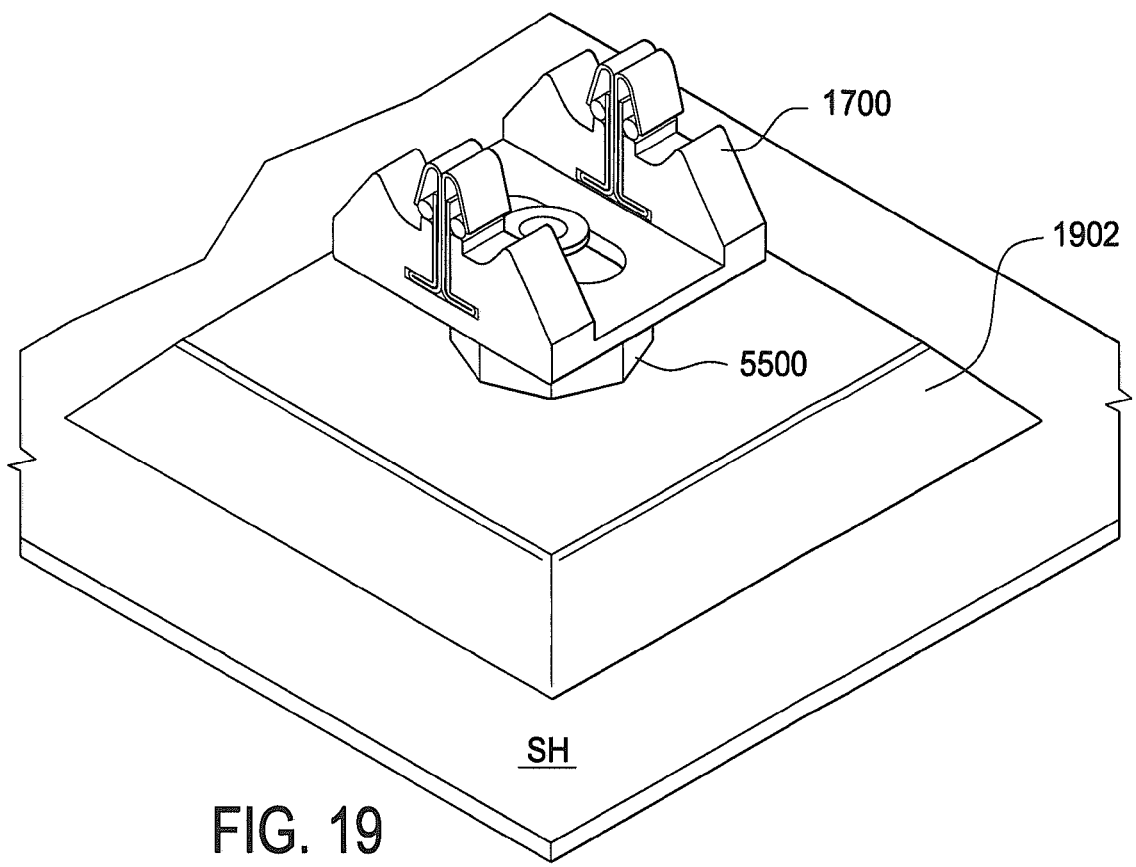
FIG. 19 is a top perspective view of the standoff of FIG. 18 supporting a W spring base.
Figure 20:
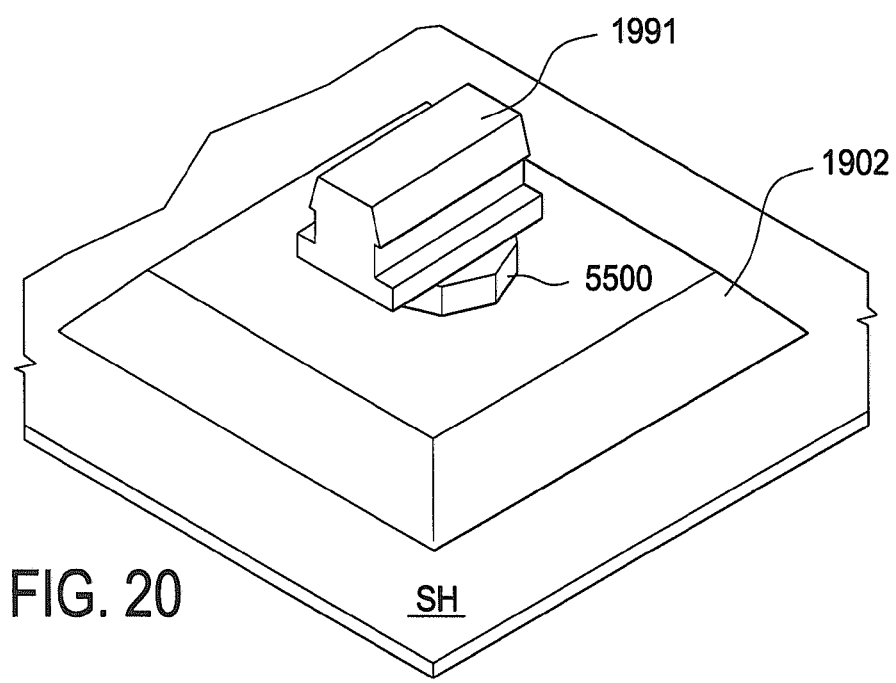
FIG. 20 is a top perspective view of the standoff of FIG. 18 supporting a T slide.

Referring next to FIGS. 19, 20 the double stud assembly 5500 can anchor a bracket 1700 or a T slide which has a hole on its bottom (not shown). A vast array of racks can be built atop the protective flashing 1902.

Figure 21:
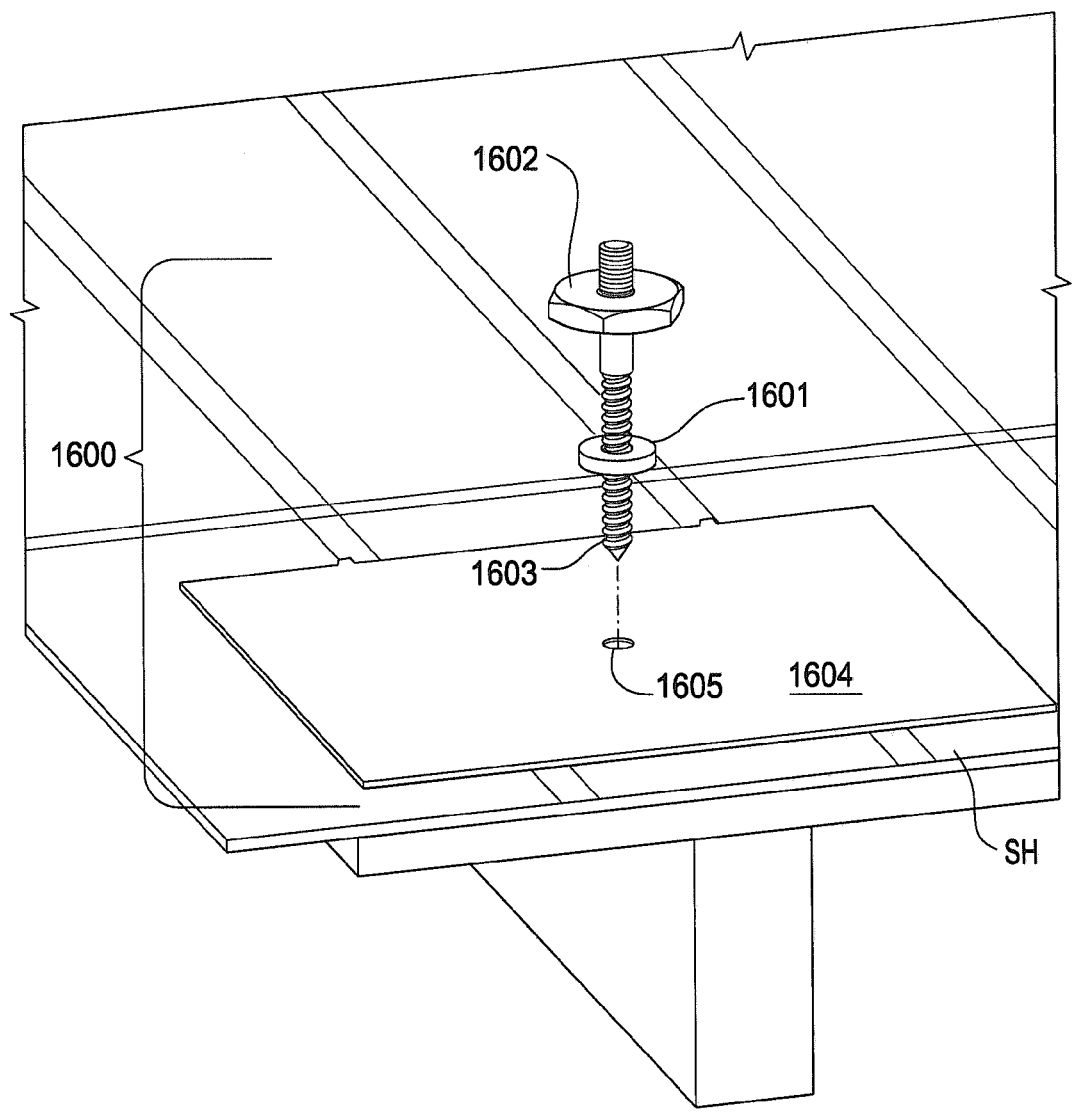
FIG. 21 is an exploded view of an alternate embodiment of a double stud bolt being installed.
Figure 22:
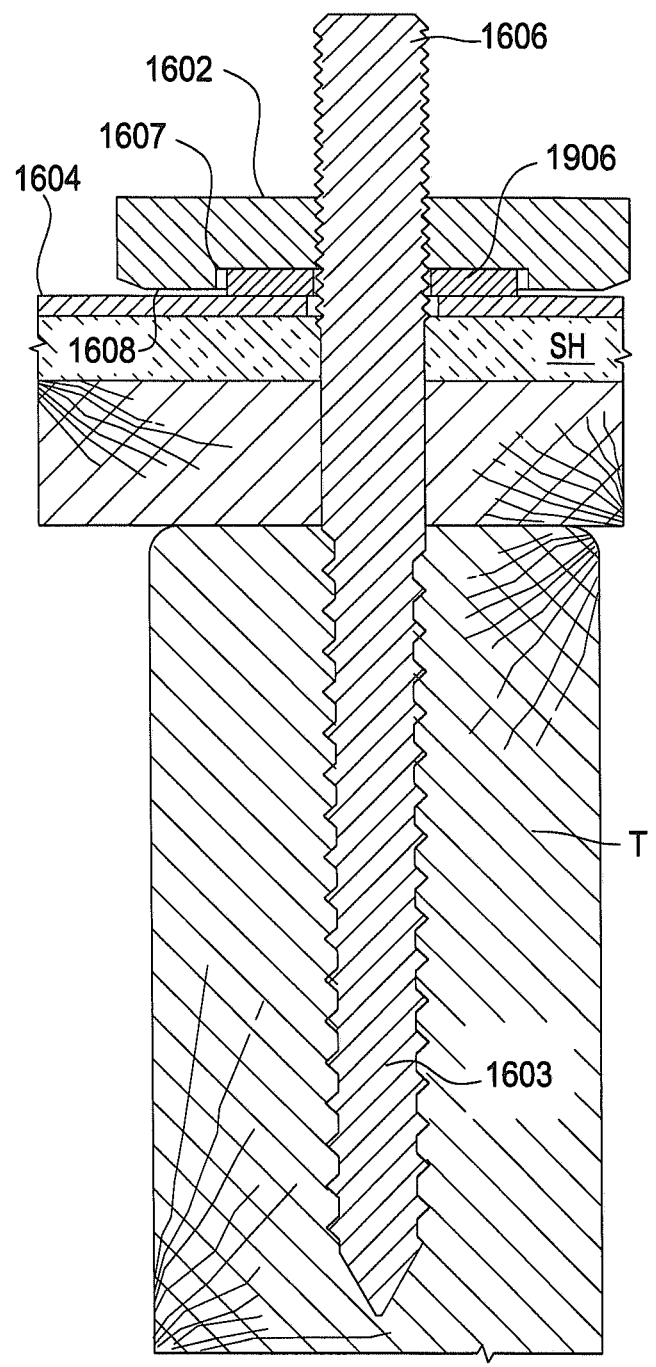
FIG. 22 is a cross sectional view of the double stud bolt of FIG. 21 installed n a roof.

FIGS. 21 and 22 show one type of an alternate embodiment of a double stud assembly 1600 formed of a body 1602 and a bolt body 1601. The variations of this embodiment allow the body 1602 to be attached to a large number of types of materials. The bolt body 1601 has a lower bolt section 1603 and an upper bolt section 1606. The lower bolt body is chosen to allow insertion and attachment to the desired material/surface and the upper bolt body is chosen for what is to be attached to the surface. The height, threading and diameter of both the lower bolt body and the upper bolt body can be varied as desired. The embodiment depicted in FIGS. 21 and 22 allows the body 1602 to be attached more directly to a roof using a lag bolt as the lower bolt body 1603. Flat flashing 1604 is placed atop shingles SH with hole 1605 in the desired attachment location. Lag bolt 1603 is the screwed into truss T, as seen in FIG. 21. The upper bolt 1606 is sized to accept whatever attachment is desired. The relative diameter of lag bolt 106 and upper bolt 1606 shown in the depicted embodiment is not required. The upper bolt 1606 could have a much larger diameter. As in prior embodiments body 1602 has recess 1607 and ridge 1608 that encapsulate flexible washer 1906 and form a water tight or near water tight seal around bolt body 1601. If desired, body 1602 can be tightened down onto flashing 1604 to achieve a metal to metal seal.

Figure 23:
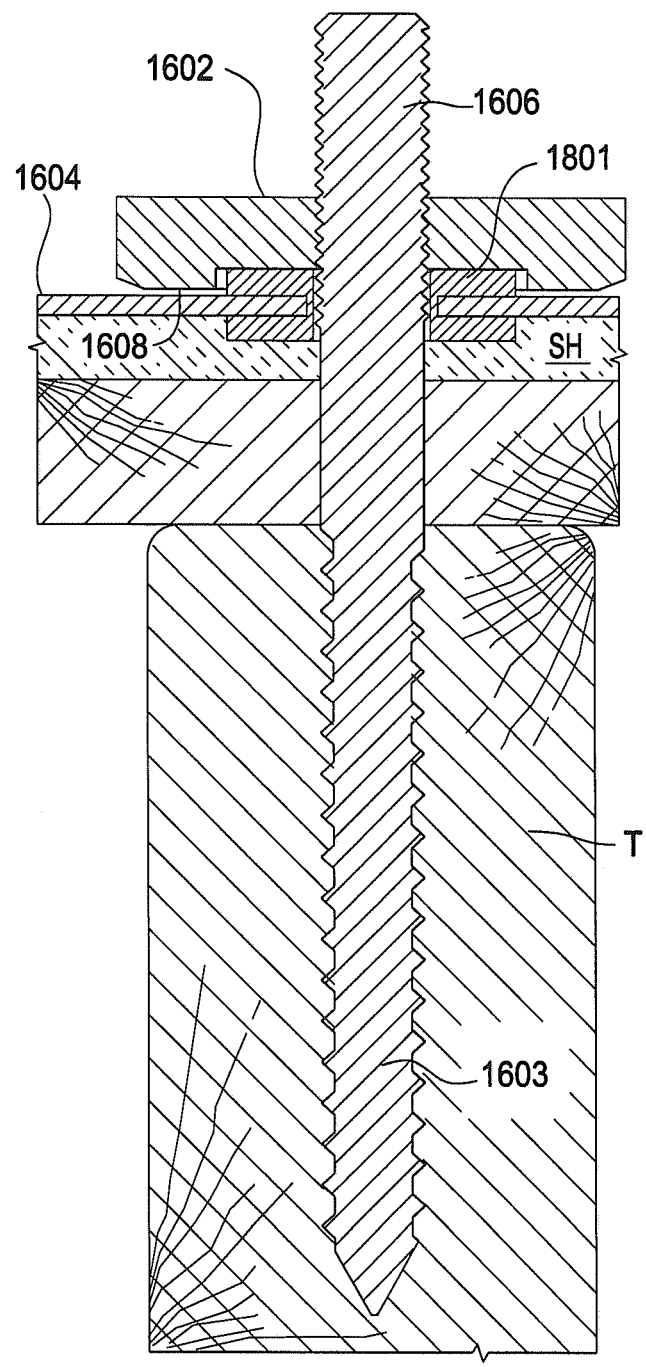
FIG. 23 is a cross sectional view of the double stud bolt of FIG. 22 with an alternate embodiment of a washer.

FIG. 23 shows an alternate embodiment of the washer 1801. In this embodiment the washer brackets the flashing 1604, reducing or preventing electrically conductive contact between the bolt body 1601 and the flashing 1604. This can also be used to reduce and/or eliminate contact between dissimilar metals.

FIGS. 24a-b and 25a-b shows two possible alternate embodiment of the body. FIGS. 24a-b shows a body 2400 of the double stud assembly with a chosen thickness $X_1$, which in depicted embodiment is about ⅜ of an inch. In this embodiment the body 2400 is formed as a separate piece from the bolts and permanently affixed thereto by a chosen adhesive. The body 2400 has a central hole 2401 that is sized to closely fit the chosen bolt body (not shown). On one side the body has recess 2402 and ridge 2403 for the washer as described above. Body 2400 also can have wrench faces WR to allow the double stud assembly to be screwed down. As before, the configuration and/or location of the wrench faces WR can be chosen to allow any number of known tools to be used. No limitation to the depicted embodiment is intended, or should be inferred.

FIG. 25a-b, shows a body 2500 with a chosen thickness $X_2$, which in the depicted embodiment is larger than $X_2$. Thickness of the body is chosen based on several parameters, including being thick enough to allow adequate number of threads for bolt size for good attachment and if additional height is wanted to give more clearance between flashing and whatever is mounted on top. In this embodiment the body 2500 is formed as a separate piece from the bolts and permanently affixed thereto by a chosen adhesive. The body 2500 has a central hole 2501 that is sized to closely fit the chosen bolt body (not shown). Alternatively, central hole 2501 could be threaded and the body threaded on to the bolt body. Further the double stud assembly could be molded or machined as a single piece. On one side the body has recess 2502 and ridge 2503 for the washer as described above. Body 2500 also can have wrench faces WR to allow the double stud assembly to be screwed down. As before, the configuration and/or location of the wrench faces WR can be chosen to allow any number of known tools to be used.

As seen in some of the other embodiments of the roof mount sealing assemblies, the body 5555, 1900, 2000, 2400, 2500 can have a threaded hole on the top surface instead of the upper bolt 5402 to allow a greater number of possible attachments. In all embodiments the washer could be formed as an O ring with suitable changes to the size of the recess. In all embodiments of the body the central hole can be threaded and the body attached to the bolt body by the threads or the central hole can be smooth and the body is attached to the bolt body by adhesives. Further the bolt body and the body could be molded and/or machined as a single unit.

Figure 26C:
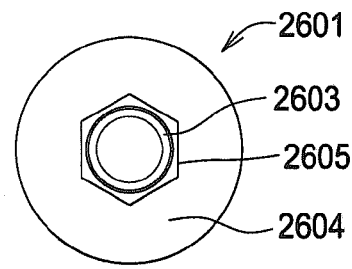
FIGS. 26 a through h are views of four possible bolt bodies.
Figure 26D:
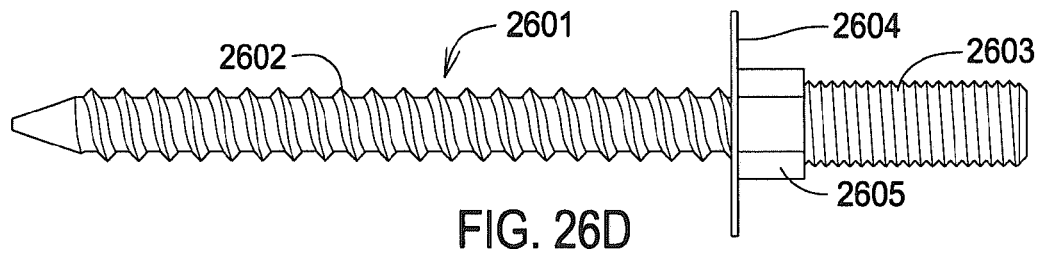
Figure 26E:
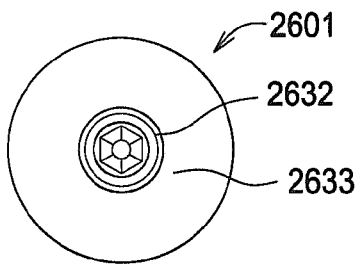
Figure 26F:
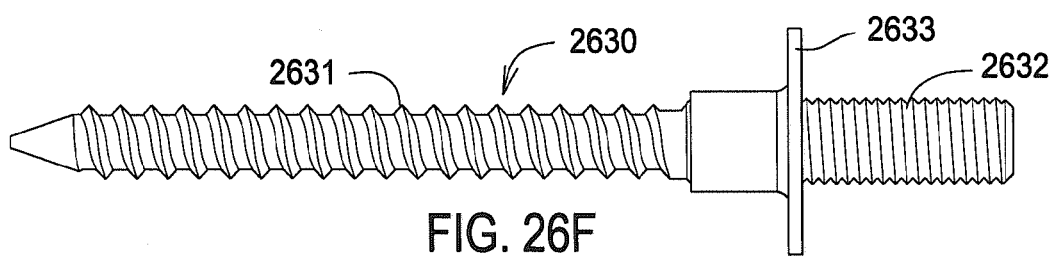
Figure 26G:
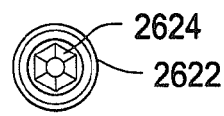
Figure 26H:
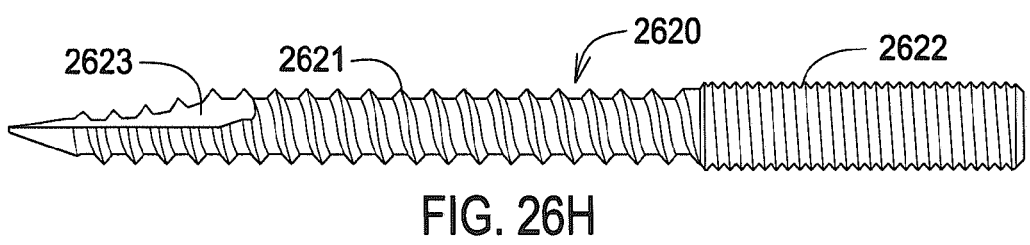

Referring next to FIGS. 26*a-b*, four possible variations of the bolt body are shown. Bolt body 2601 has a lower bolt body 2602 that is formed with a lag thread bolt. This type of lower bolt body 2601 works well on wood. Bolt body 2601 has an upper bolt body 2603 with machine threads. In all embodiments upper bolt body and lower bolt body have external threads. The spacing and configuration of the threads will vary depending on the desired use of the double stud assembly. Choosing appropriate threading for the desired application is well known in the art and will not be further discussed. Washer 2604 and nut 2605 are provided between the upper bolt body 2603 and the lower bolt body 2602. The nut 2605 allows the lower bolt body 2602 to be driven into the wood of the roof and the washer 2604 serves as a stop to control the depth that the bolt body 2601 is driven. The washer also assists in ensuring a good support for the flexible washer 1902 to ensure a good compression. In this embodiment the bolt body and washer would most likely be cast or machined. Bolt body 2601 would require a raised flashing (2800).

Bolt body 2610 has a lower bolt body 2602 and an upper bolt body 2611 with a metal washer 2612. As can be seen in FIG. 26*a*, the upper bolt body 2611 of bolt body 2610 has a tool space 2616 formed into it top end. In the depicted embodiment the tool space is form to receive and Allen wrench. Other configurations of the tool space (not shown) could be used as well, such as tool spaced configured for standard screw drivers and Phillips head screw drivers.

Bolt body 2620 has an upper bolt body 2622 and a lower bolt body 2621. Lower bolt body 2621 has a self tap section 2623. The self tap section can be used on any of the depicted bolt bodies. Upper bolt section 2622 is depicted with optional tool space 2624. This bolt body 2620 might be used on metal roof application or tile where the body 2500 could be provided at roof level and the upper bolt section 2622 would stick up the appropriate length. The lower bolt section 2631 of this application could be machine or lag.

Bolt body 2630 has lower bolt body 2631 and upper bolt body 2632 and metal washer 2633 placed between. Washer 2633 is a combination washer with a lower internally threaded body attached to the washer, commonly known as a weld nut. The washer threaded onto upper bolt body 2632 and serves as a stop to prevent over threading lower bolt body 2631 into the roof. The washer 2633 also serves as a base for the flashing and prevents pushing/deforming the flashing into the roof/shingle when threading an attachment onto the upper bolt body 2632. The washer 2633 facilitates the compression of the flexible washer between the flashing and the body with recess when installed without a base plate. The washer 2633 is attached to the bolt either chemically, welded, or mechanically crimped. In the depicted embodiment a thread locking compound (chemically) looks the weld nut onto the bolt. The washer 2633 has no external threads which facilitates going into the plywood of most roofing assemblies and not lifting the plywood from the rafter due to threads not lining up properly upon installation. Also given the larger shaft diameter, it helps friction fit the predrilled hole and provide additional horizontal support. It also provides a semi-impermeable seal in asphalt shingle roofing applications, and tile underlayment applications, should water penetrate the roofing from other locations (not our flashing). This is a the one location that caulk would be recommended in certain applications providing another "safety" barrier to moisture or water from roofing failures above The washer 2633 facilitates the body 2500 to be tightened in a metal to metal compression zone be to achieve the waterproofing. As stated above if the structural member splits, degrades or ever the roofing material under the flashing the waterproofing is not affected. Bolt configuration 2630 is the most common one used for wooden roof installations. It has a lag bottom that needs to be predrilled in most applications. 2623 is a self drilling version no pilot hole. Lower bolt body 2632 can be driven in to a wooden stud with just a hanger bolt driver but such driver cannot back out the bolt body should removal (reroof or bad attachment). The bolt body can be backed out with two standard nuts tightened against one another. In some applications this is very difficult and the top hex, Allen, torc, nut or tool spaces facilitate the installation or removal of the bolt bodies. The tool spaces could be configured for a slot or Phillips screw driver.

Figure 27C:
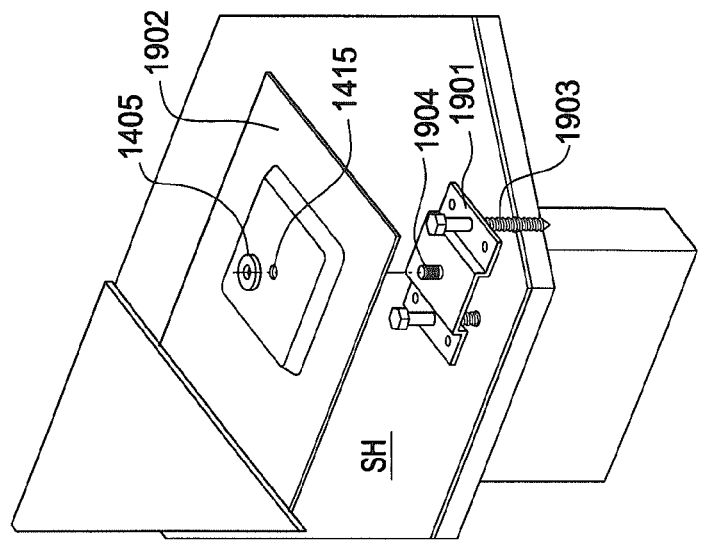
FIGS. 27 a through c are exploded views of various possible configurations of the body being used with a base and raised flashing.
Figure 27B:
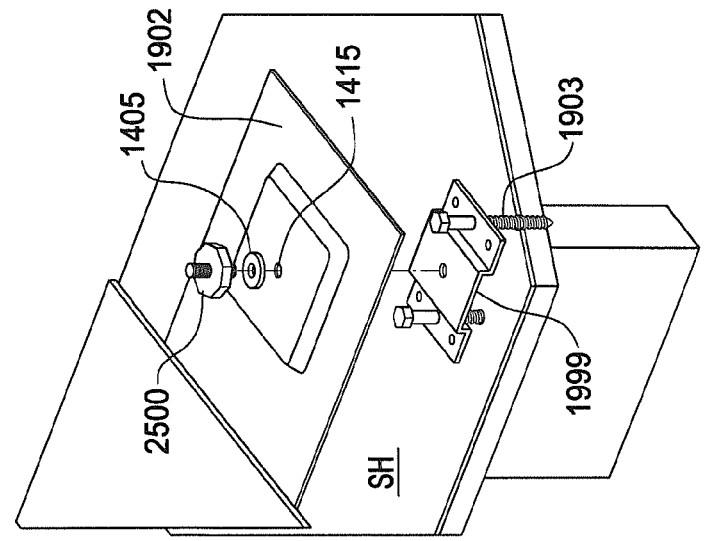
Figure 27A:
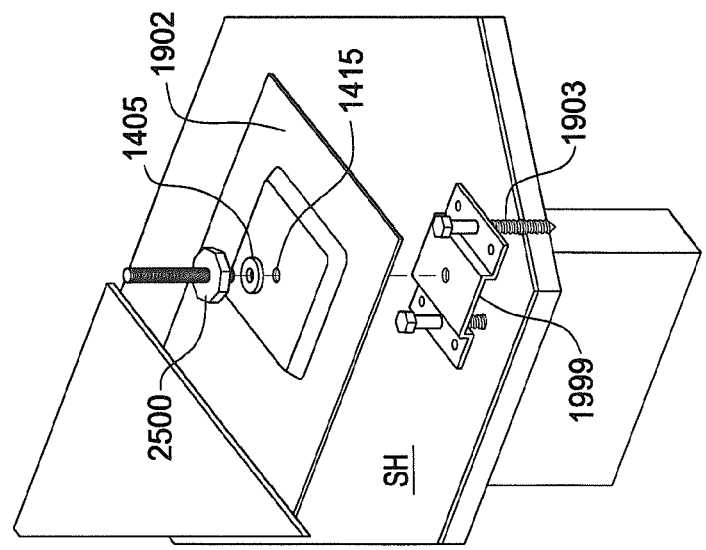

FIGS. 27*a-c* show a body 2701 being used with base 1901 and base 1999 and flashing 1902 as described previously. In all embodiment the body 2701 (1602, 2400, 2500) with it recess and ridge encapsulated washer 1405 as seal hole 1415 in flashing 1902. As mentioned previously the body can have many different configurations, depending on its desired function. The necessary features are the recess and the sealing ridge to encapsulate the washer 1405 or and O-ring (now shown) to seal the exterior of the roof mounting assembly against water.

Figure 28B:
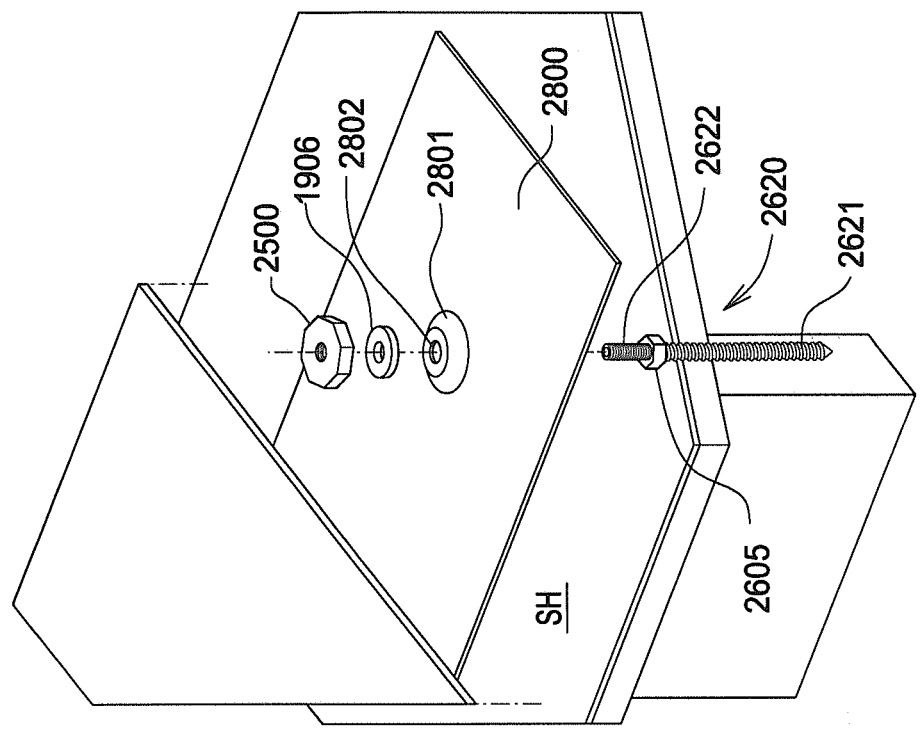
FIGS. 28 a through d are exploded views of various possible combinations of a body and bolt body being used with a bump flashing to encapsulate the washer.
Figure 28A:
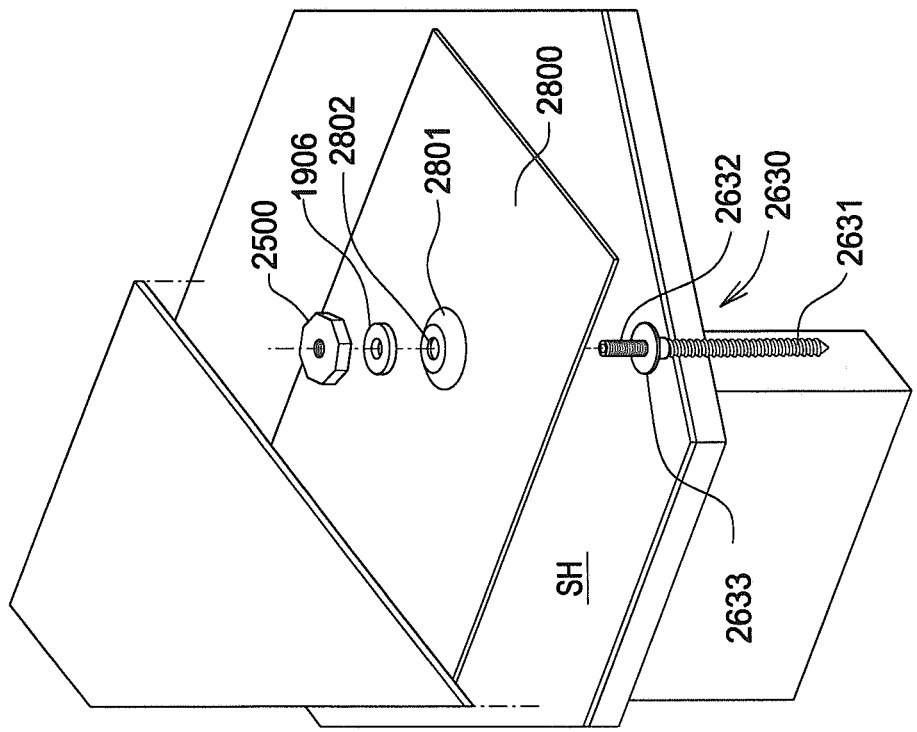

FIG. 28*a* is an exploded view of bolt body 2630 being mounted on a roof with a bump flashing 2800 and a body 2500. Any of the disclosed bodies could be used as well; no limitation to the depicted body 2500 is intended or should be inferred. The bump flashing 2800 has a smaller raised area 2801 than flashing 1902 with hole 2802 in raised area to allow the upper bolt body 2632 to extend there through. The smaller raised area 2801 of flashing 2800 is useful when no metal to metal contact of the flashing and the body is 2500 is desired. Additionally, the bump may assist in diverting water around the penetration in the roof, which may assist in keeping the mount sea. In installations of photovoltaic panels, the added height above the roof allows for greater heat dissipation. In the depicted embodiment the central hole 2501 of body 2500 is threaded and screws on the threads of upper bolt body 2632. Flexible washer 1906 is placed over upper bolt body 2632 and then body 2500 is threaded down onto upper bolt body 2632, encapsulating the flexible washer 1906 and forming the seal discussed above.

Figure 28D:
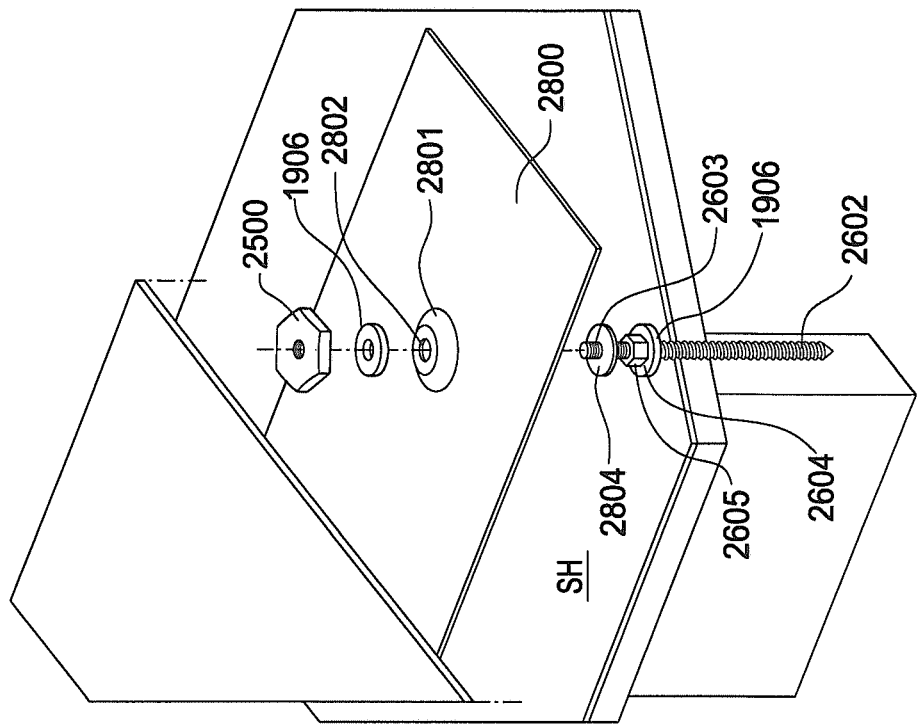
Figure 28C:
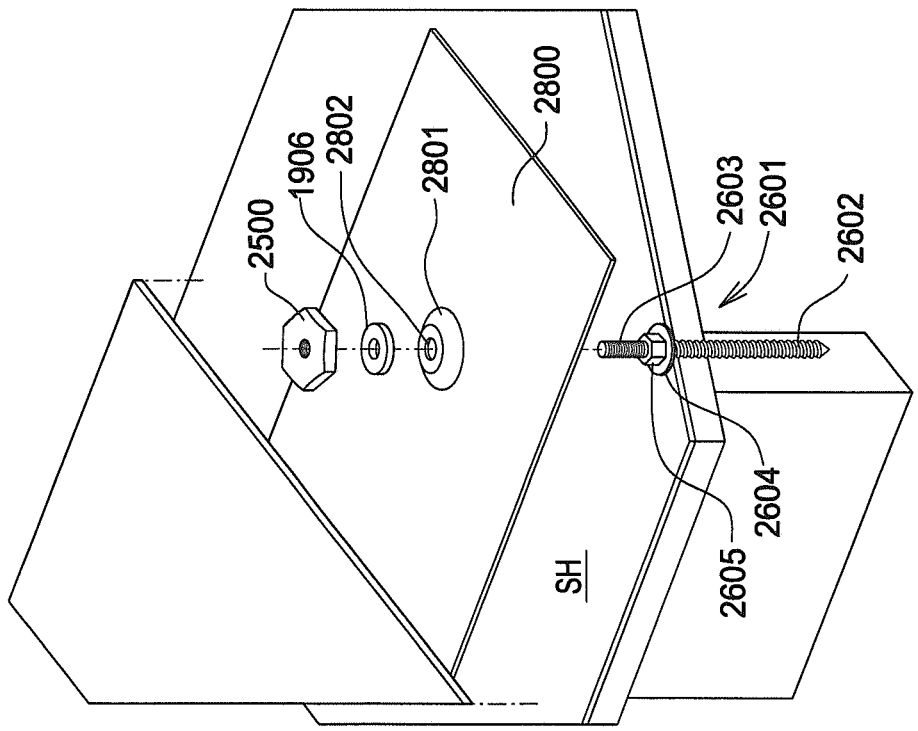

FIG. 28b is an exploded view of a bolt body 2620 with nut 2605. Bump flashing 2800, flexible washer 1906 and body 2500 as attached as above. FIG. 28c shows the same with metal washer 2604 added under nut 2605. FIG. 28d adds another flexible washer 1906 between the metal washer 2604 and the single SH and another metal washer 2804 above the nut.

Figure 29:
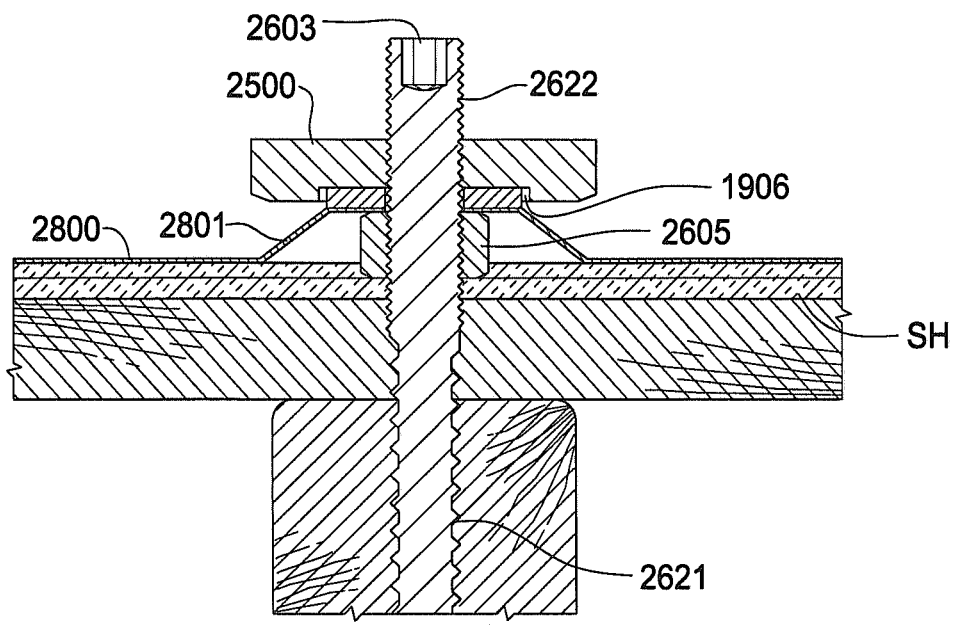
FIG. 29 is a cross sectional view of the embodiment of FIG. 28a when installed.
Figure 30:
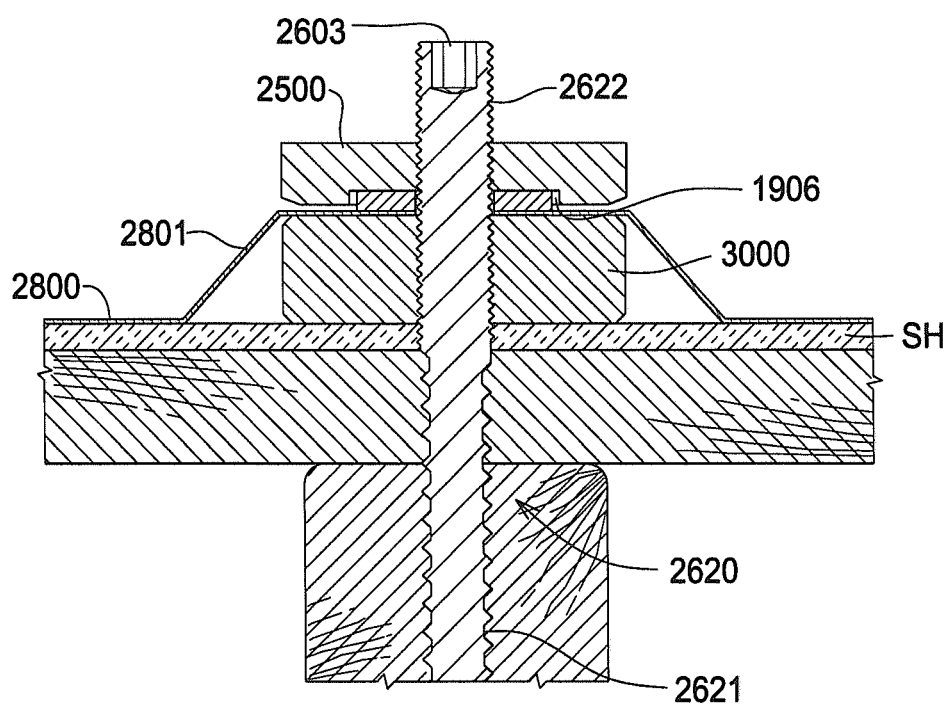
FIG. 30 is a cross sectional view of a double stud assembly installed with a bump flashing with a spacer.

FIG. 29 is a cross sectional view of the assembly of FIG. 28b installed on a roof. The lower bolt body 2621 is drilled into the wooden stud, the plywood sheathing and the shingle SH. Upper bolt body 2622 has FIG. 30 is a cross sectional view of a roof mount sealing assembly with bolt body 2620 and body 2500. Bump flashing 2800 is used with spacer 3000 placed between the raised area 2801 and shingle SH.

Figure 31B:
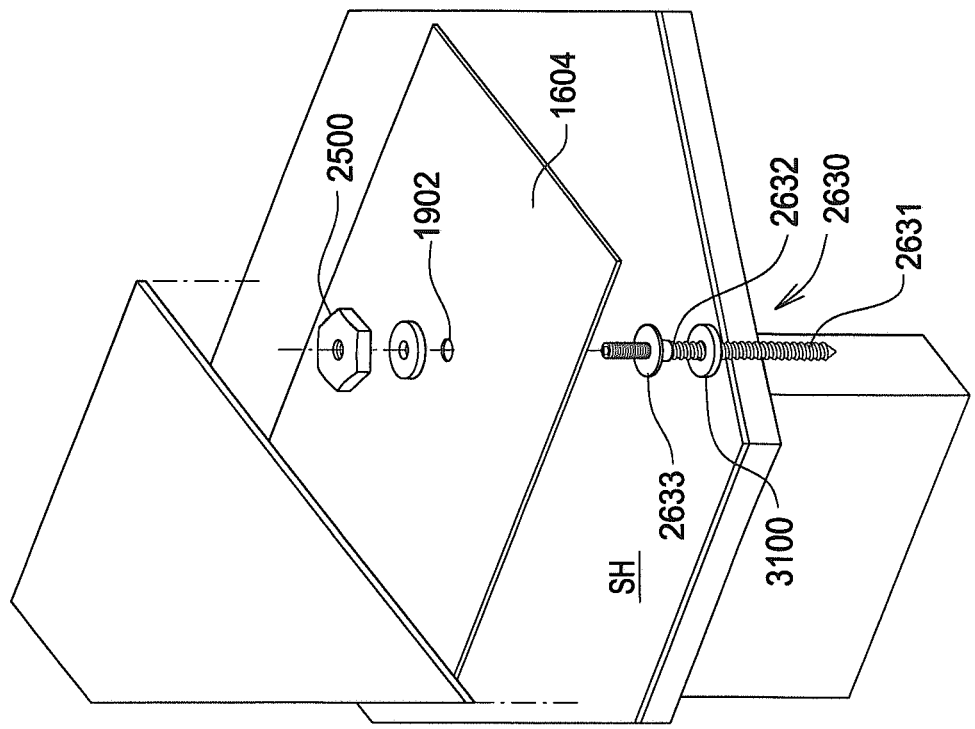
FIGS. 31 a and b are exploded views of a double stud assembly installed with a flat metal flashing.
Figure 31A:
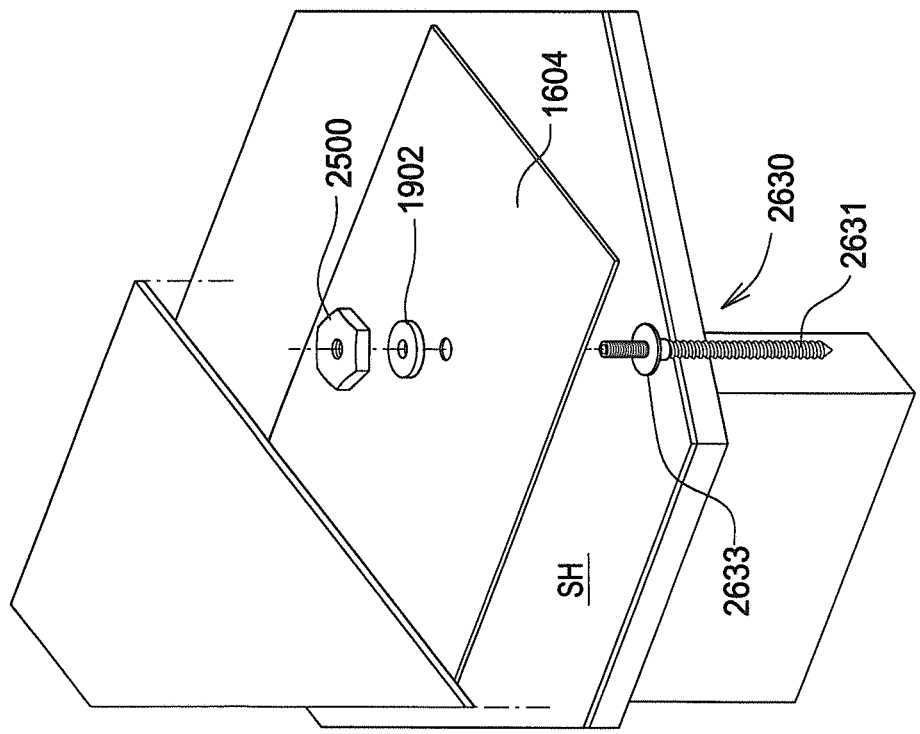
Figure 32:
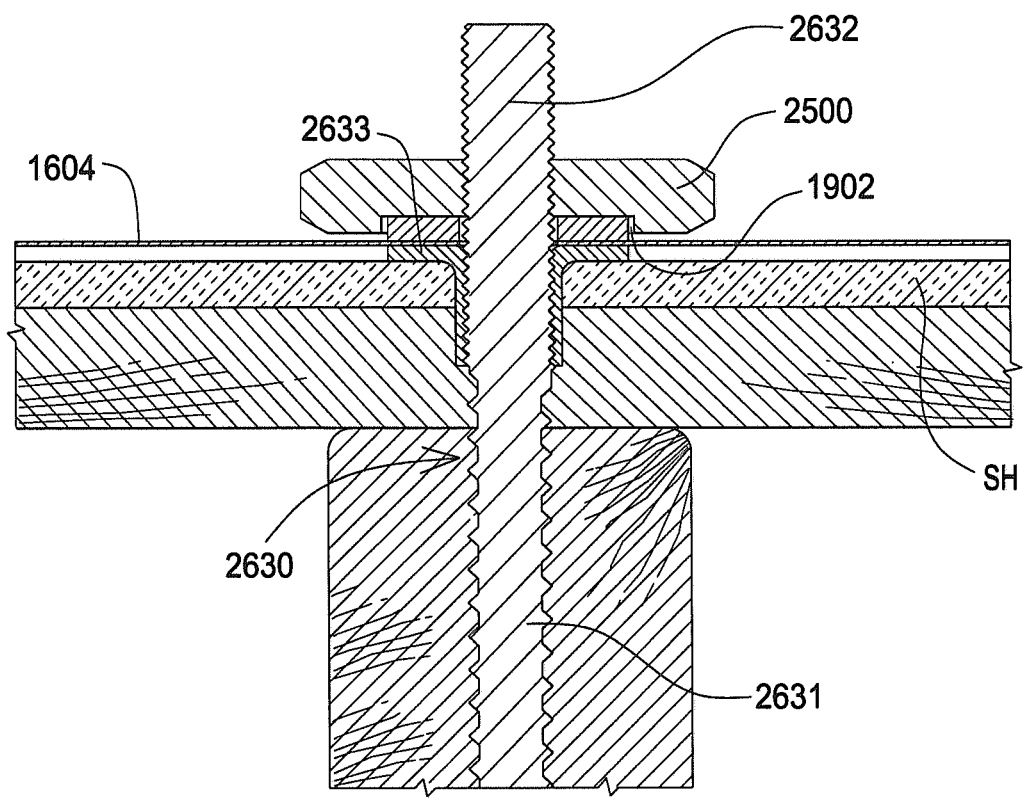
FIG. 32 is a cross sectional view of the embodiment of FIG. 31a when installed.

FIG. 31 is an exploded view of a double stud assembly being mounted with a flat metal flashing 1604. In this embodiment bolt body 2630 has weld nut 2633 and the flexible washer 1906 is placed between the flashing and the body 2500. FIG. 31b an additional metal washer 3100 is placed between the weld nut and the shingle SH. FIG. 32 is a cross section of the embodiment of FIG. 31 mounted on a roof.

When the body with the recess is screwed onto the bolt body in the field, it utilizes thread compound on the threads for waterproofing threaded connection. This thread compound also can provide dielectric separation as the body can be aluminum, stainless, steel, or other material that may be different from the bolt body.

One example, a bolt body is going into wood and has hanger bolt bottom with weld nut. Bolt body is carbon steel zinc plated as the weld nut. Flashing is steel but body is aluminum as is the device that will be attached to the upper bolt section. In this case the dielectric properties facilitate a proper connections with economical options i.e. not having to utilize all stainless components A wide variety of objects could be attached to the roof mount sealing assembly by attaching to the upper bolt section, the threaded hole on the body and/or on to one of the depicted standoffs. No limitation should be implied as to the objects that can be attached to a building by on the disclosed embodiments.

Figure 33B:
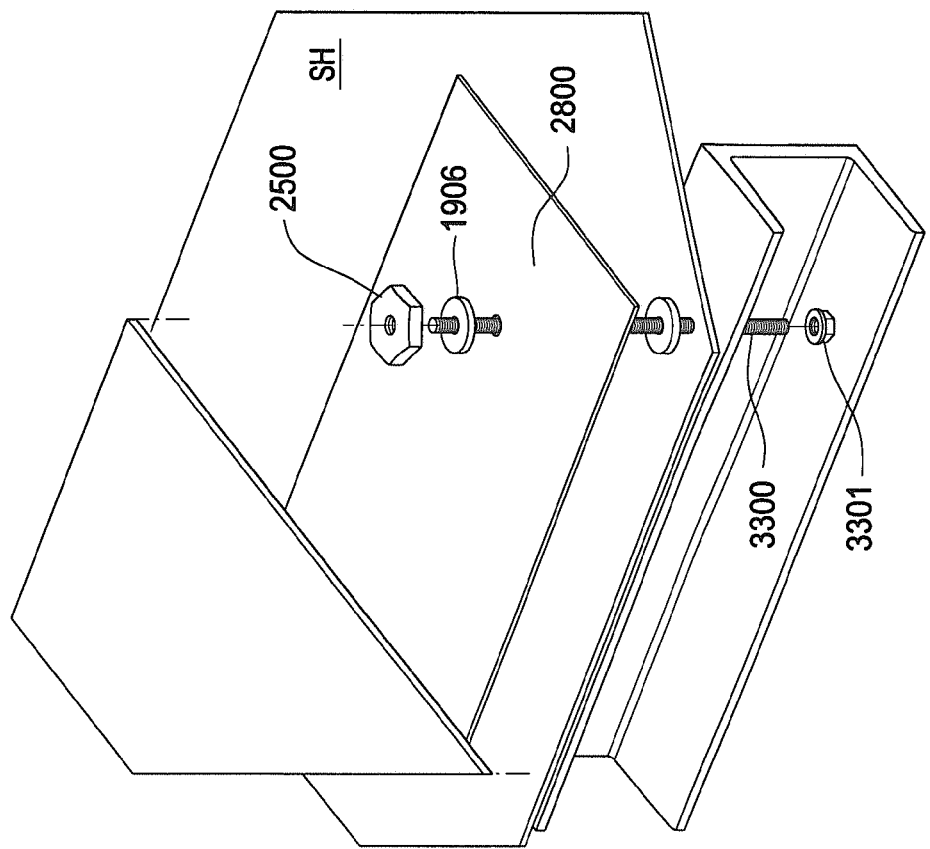
FIGS. 33 a and b are exploded views of a double stud assembly installed on a roof with a metal support beam.
Figure 33A:
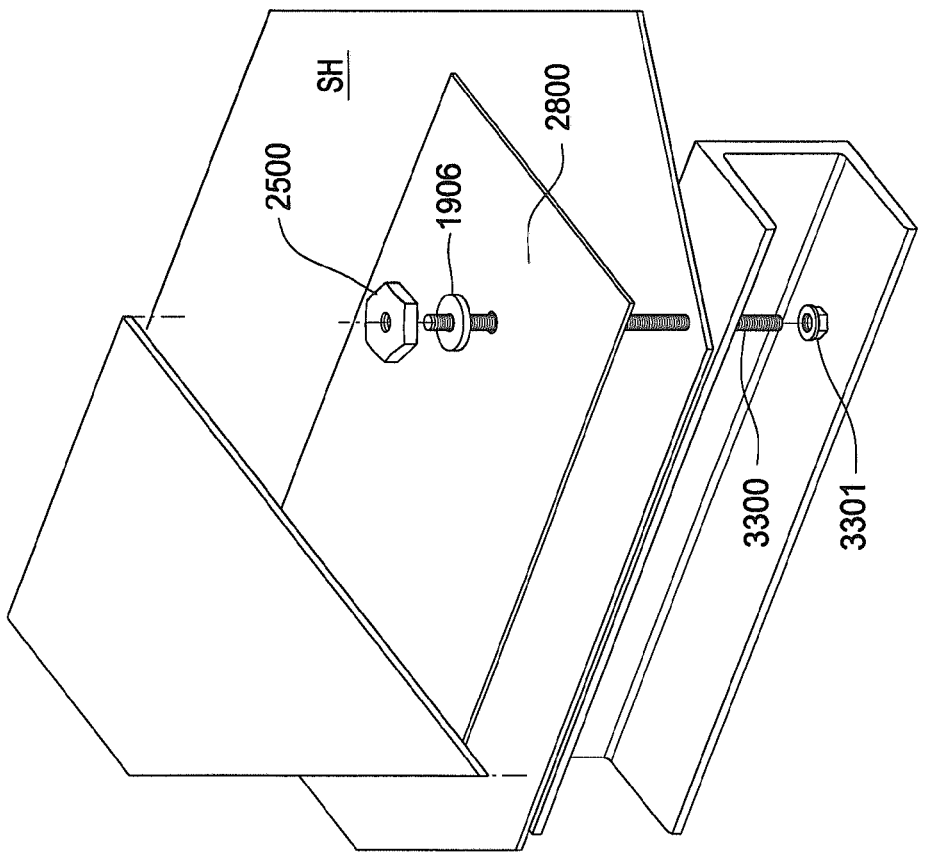

FIGS. 33 a and b are exploded views of a embodiment of the double stud assembly being mounted on the roof of a building with metal structural members. Bolt body 3300 is used with a flat flashing 2800, a flexible washer 1906 and body 2500. Nut 3301 can be used to secure the bolt body 3300 in place. The size of the bolt body is not necessarily to scale in this figure.

Figure 34A:
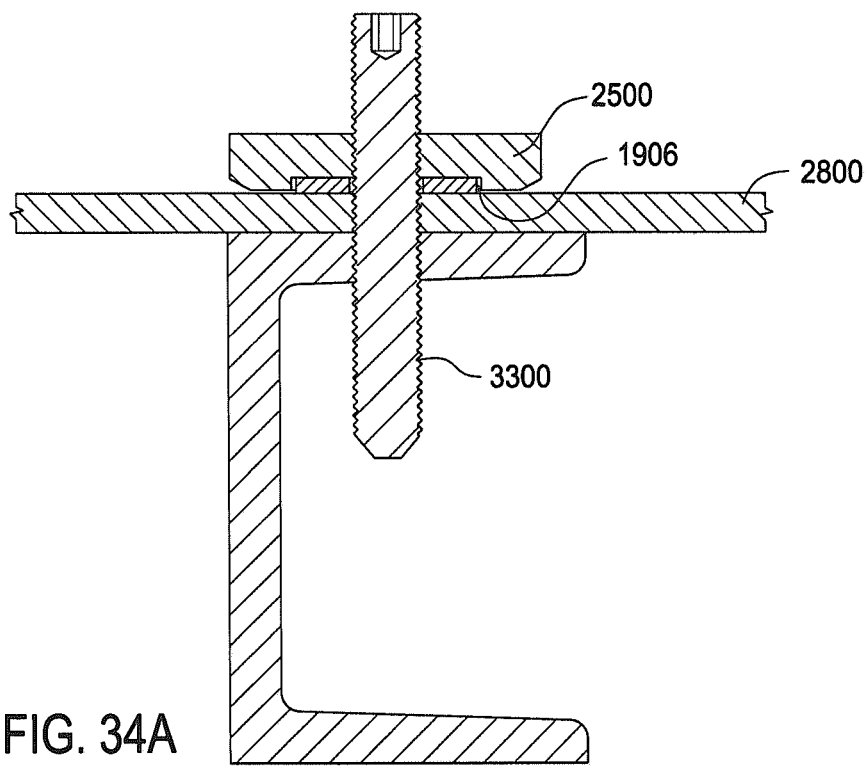
FIGS. 34 a and b are cross sectional views of double stud assemblies installed in a metal support beam.
Figure 34B:
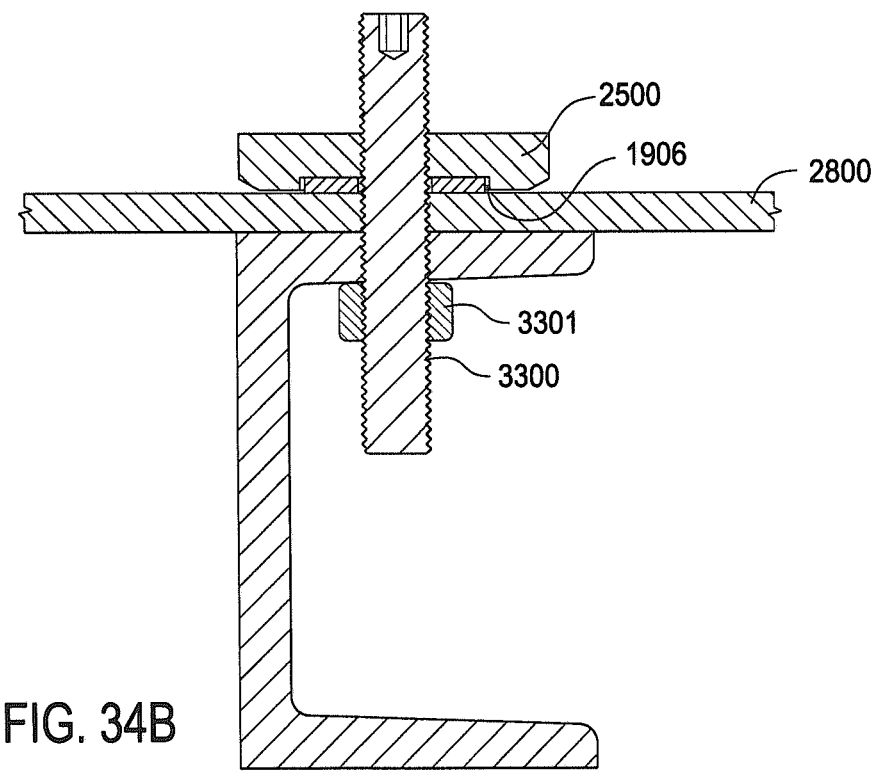
Figure 35:
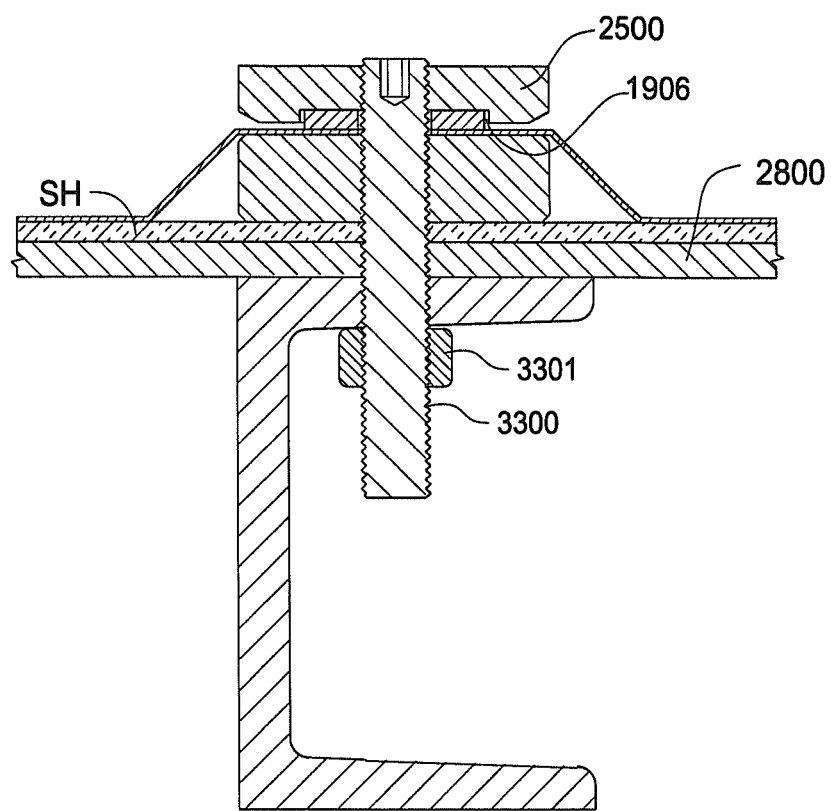
FIG. 35 is a cross sectional view of an another embodiment of the double stud assembly.

FIGS. 34a and b are cross sectional views of a double stud sealing assembly mounted in a metal support beam. In FIG. 34b nut 3301 is added. FIG. 34a has a self tapping metal screw to attach in into beam where access to the beam may or may not be possible. FIG. 34 b has a standard bolt nut application where the beam is accessible to place a nut on the underside. The illustration is for a finished metal roof surface or siding. FIG. 35 shows a bump flashing being used on a metal support beam.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

What is claimed:

1. A roof standoff device for use in mounting an object to a roof, said standoff device comprising:
   a base bracket having at least one mounting hole for receiving an attachment element for attaching the base bracket to a roof surface, said base bracket further including a first threaded attachment element;
   a flashing having:
      a raised section with an upper surface and an aperture extending through said raised section, wherein said aperture is configured for alignment with said first threaded attachment element of said base bracket;
      a flange extending beyond a base of said raised section, wherein, when disposed over said base bracket on the roof surface, an inside surface of said raised section receives and surrounds said base bracket and said flange rests on the roof surface;
   a core body having a first end and a second end, said second end having a contact surface;
   a second threaded attachment element associated with said second end of said core body, said second threaded attachment element configured to threadably engage said first threaded attachment element, wherein, upon said first and second threaded attachment elements being threadably engaged, said flashing is compressed between said base bracket and said second end of said core body; and
   said core body having a third attachment element disposed proximate to said first end for attaching an object to said core body.

2. The device of claim 1, wherein said upper surface of said raised section comprises a planar surface and said contact surface of said core body is disposed in a common plane.

3. The device of claim 2, wherein a periphery of said contact surface of said core body is in direct contact with said planar surface of said flashing when said first and second threaded attachment elements are threadably engaged compressing said flashing between said base bracket and said second end of said core body.

4. The device of claim 2, wherein said contact surface comprises a continuous ridge extending about a recess in said second end of said core body.

5. The device of claim 4, further comprising:
a soft washer disposed in said recess, wherein said soft washer surrounds said aperture in said flashing and is compressed between said second end of said core body and said planer upper surface of said flashing upon said first and second threaded attachment elements being threadably engaged.

6. The device of claim 1, wherein:
said first threaded attachment element comprises a threaded bolt attached to said base bracket, wherein said threaded bolt is configured to extend through said aperture in said raised section of said flashing; and
said second threaded attachment element comprises a threaded aperture formed in said second end of said core body.

7. The device of claim 1, wherein:
said first threaded attachment element comprises a threaded aperture in said base bracket; and
said second threaded attachment element comprises a threaded bolt extending from said second end of said core body, wherein said threaded bolt is configured to extend through said aperture in said raised section of said flashing.

8. The device of claim 7, wherein said threaded bolt passes though said core body, wherein a head of said threaded bolt engages said core body proximate to said first end of said core body when engaged with said first threaded attachment element.

9. The device of claim 1, wherein said base bracket further comprises:
a raised portion surrounding said first attachment element.

10. The device of claim 9, wherein a portion of said flashing surrounding said aperture is compressed between said raised portion of said base bracket and said contact surface.

11. The device of claim 10, wherein a lower surface of said raised section of said flashing is in direct contact with said raised portion of said base bracket.

12. The device of claim 1, wherein said third attachment element comprises a threaded attachment element.

13. The device of claim 1, wherein said core body comprises an elongated structure.

14. A roof standoff device for use in mounting an object to a roof, said standoff device comprising:
a base bracket having at least one mounting hole for receiving an attachment element for attaching the base bracket to a roof surface, said base bracket further including a first threaded attachment element and a raised surface surrounding the first threaded attachment element;
a flashing having:
a raised section with a planar upper surface and an aperture extending through said raised section; and
a flange extending beyond a base of said raised section, wherein, when disposed over said base bracket on the roof surface, an inside surface of said raised section overlays said raised surface of said base bracket surrounding said first threaded attachment element;
a core body having a first end and a second end, said second end having a contact surface disposed in a common plane about its periphery;
a second threaded attachment element configured to threadably engage said first threaded attachment element, wherein, upon said first and second threaded attachment elements being threadably engaged, said flashing is compressed between said raised surface surrounding said first threaded element and said second end of said core body, wherein said periphery of said contact surface is in direct contact with said planar upper surface of said flashing; and
said core body having a third attachment element disposed proximate to said first end for attaching an object to said core body.

15. The device of claim 14, wherein at least a portion of said periphery of said contact surface directly overlays said raised surface of said base bracket.

16. The device of claim 14, wherein at least a portion of said raised surface is in direct contact with said inside surface of said raised section of said flange.

17. The device of claim 14, further comprising:
a soft washer disposed about said aperture in said flashing, wherein said soft washer is compressed upon said first and second threaded attachment elements being threadably engaged.

18. The device of claim 17, wherein said washer is received in a recess.

19. The device of claim 18, wherein said recess is formed in said second end of said core body, wherein said contact surface comprises a continuous ridge extending about said recess.

20. The device of claim 14, wherein said contact surface and said flange are metal elements and said periphery of said contact surface is in metal to metal contact with said flange.

* * * * *